United States Patent [19]

Yoshimatsu

[11] Patent Number: 4,891,506
[45] Date of Patent: Jan. 2, 1990

[54] MULTI-USE PORTABLE ELECTRONIC DEVICE

[75] Inventor: Kenzo Yoshimatsu, Kawasaki, Japan

[73] Assignee: Kabushiki Kaisha Toshiba, Kawasaki, Japan

[21] Appl. No.: 154,372

[22] Filed: Feb. 10, 1988

[30] Foreign Application Priority Data

Feb. 20, 1987 [JP] Japan .................. 62-37073

[51] Int. Cl.⁴ ............................................ G06K 19/06
[52] U.S. Cl. ...................................... 235/492; 235/487
[58] Field of Search ............................. 235/492, 487

[56] References Cited

U.S. PATENT DOCUMENTS 4,734,568 3/1988 Watanabe ............................ 235/487

FOREIGN PATENT DOCUMENTS 3622257 1/1987 Fed. Rep. of Germany .

*Primary Examiner*—Harold I. Pitts
*Attorney, Agent, or Firm*—Cushman, Darby & Cushman

[57] ABSTRACT

A portable electronic device, also known as an IC card, according to the invention has a control element and a data memory. The memory area of the data memory is divided into a directory area and a user area. The user area is divided into a plurality of data-storing areas. Groups of area-defining data items are stored in the directory area, each data item defining one data-storing area of the user area. In addition, a group of data items defining the groups of area-defining data items is also stored in the directory area. The control element selects one of the groups as the group defining the data-storing area of the user area which can be used, in accordance with one of the data items of the group, which has been designated by the data supplied from an external device. The control element accesses those data-storing areas of the user area which are defined by the selected group. Hence, data can be separately written into, or read from, these, different accessed areas so that the IC card may be used for a variety of purposes.

20 Claims, 21 Drawing Sheets

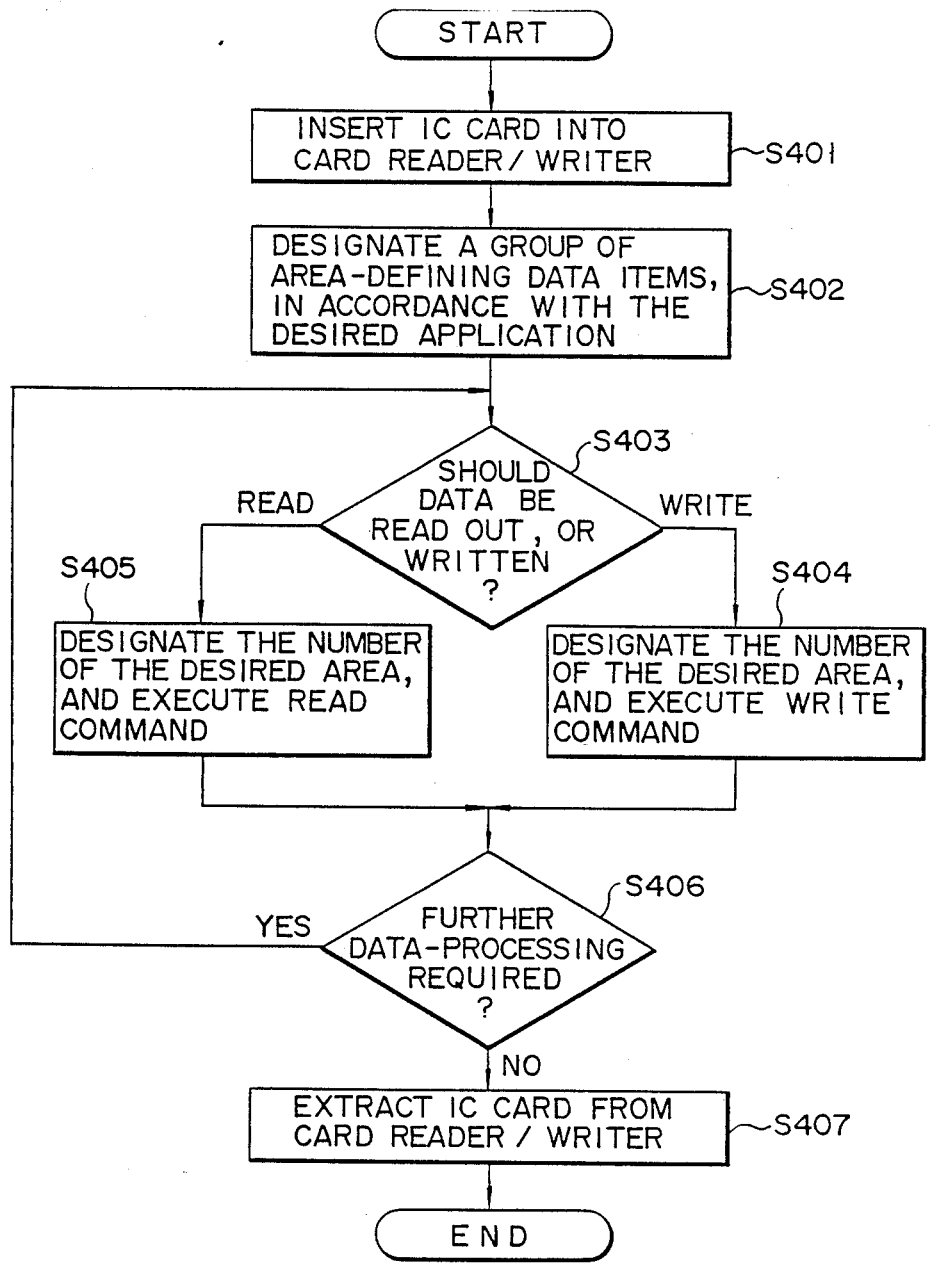
F I G. 4

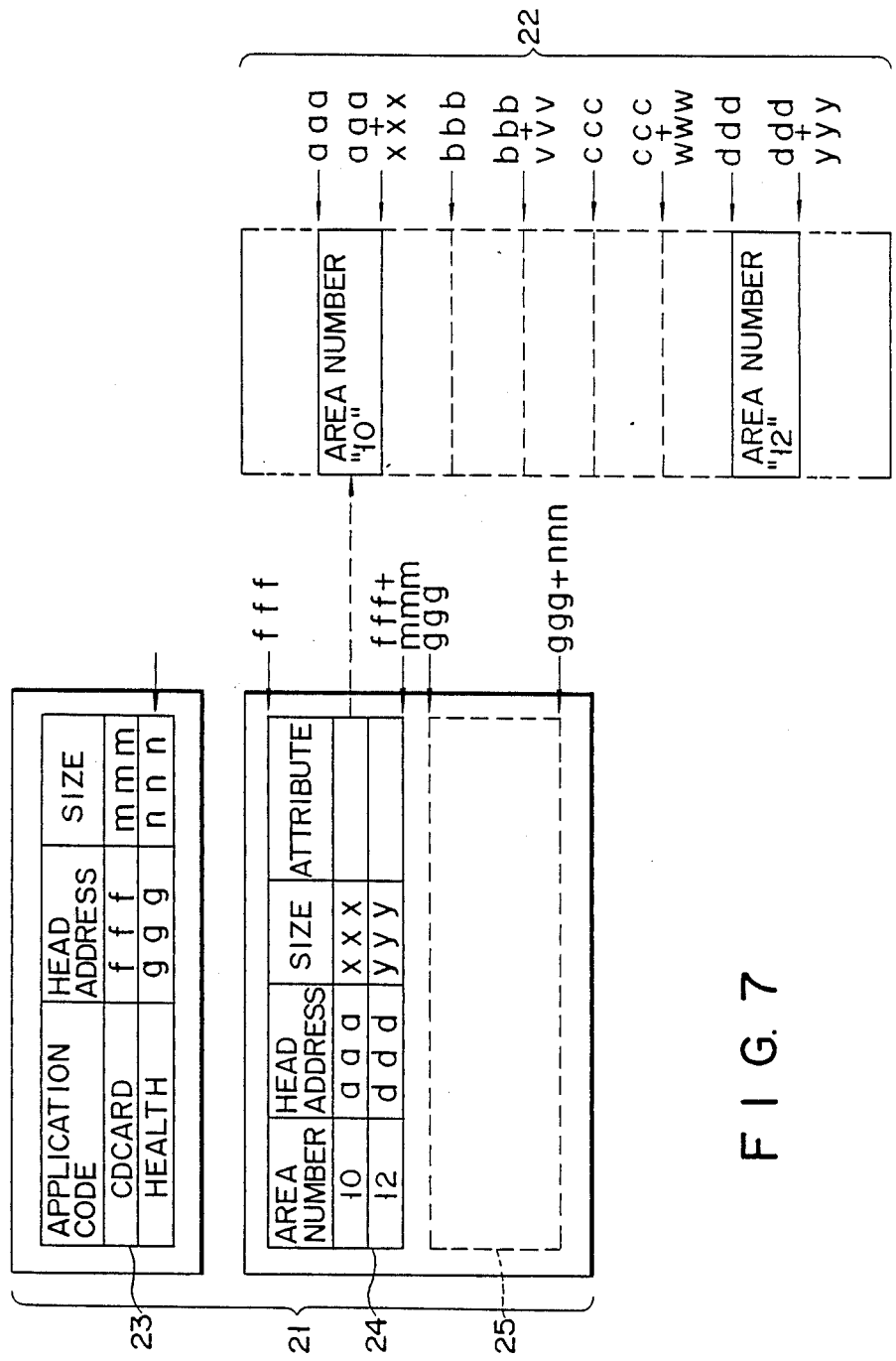
F I G. 7

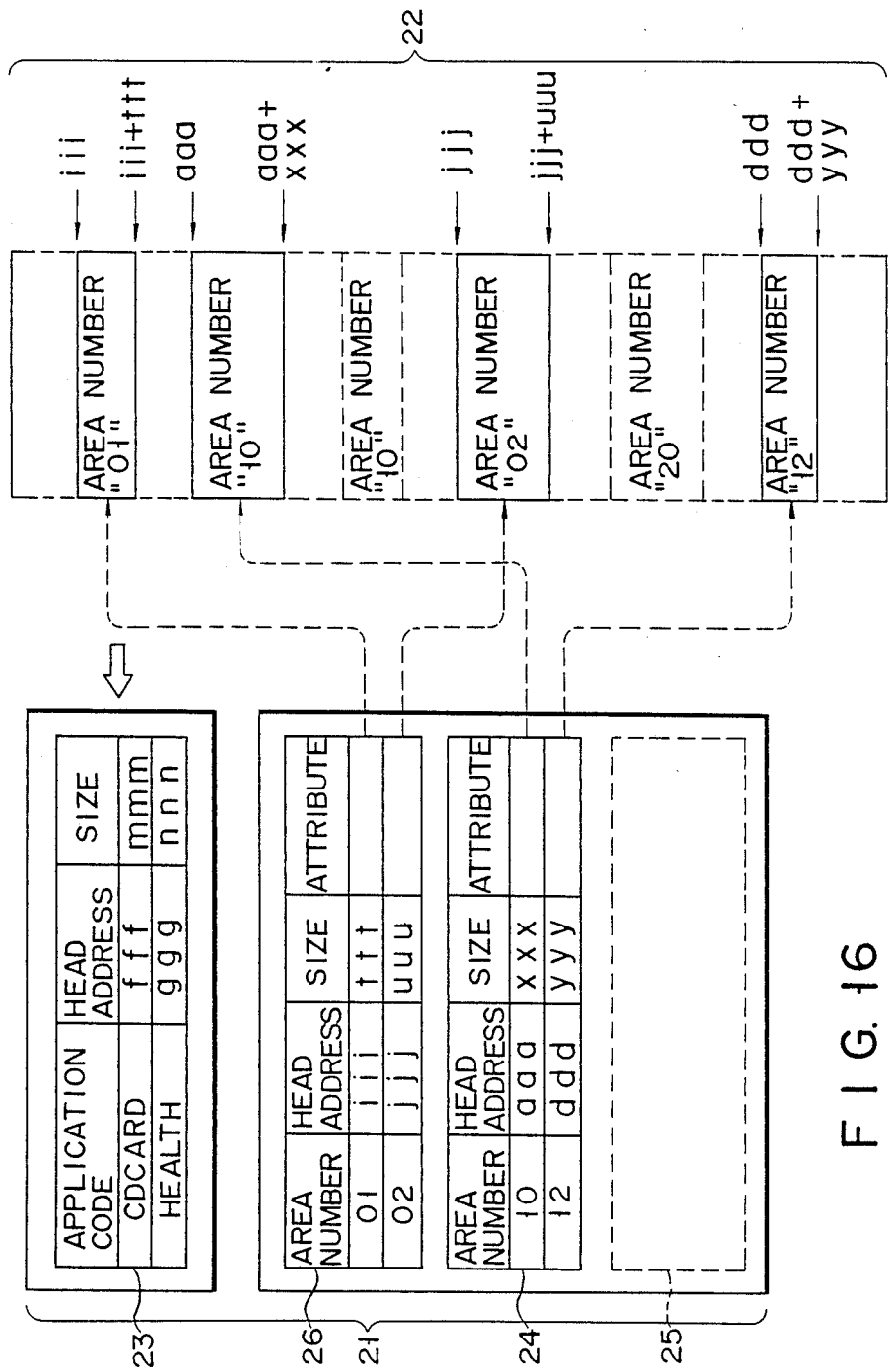
F I G. 16

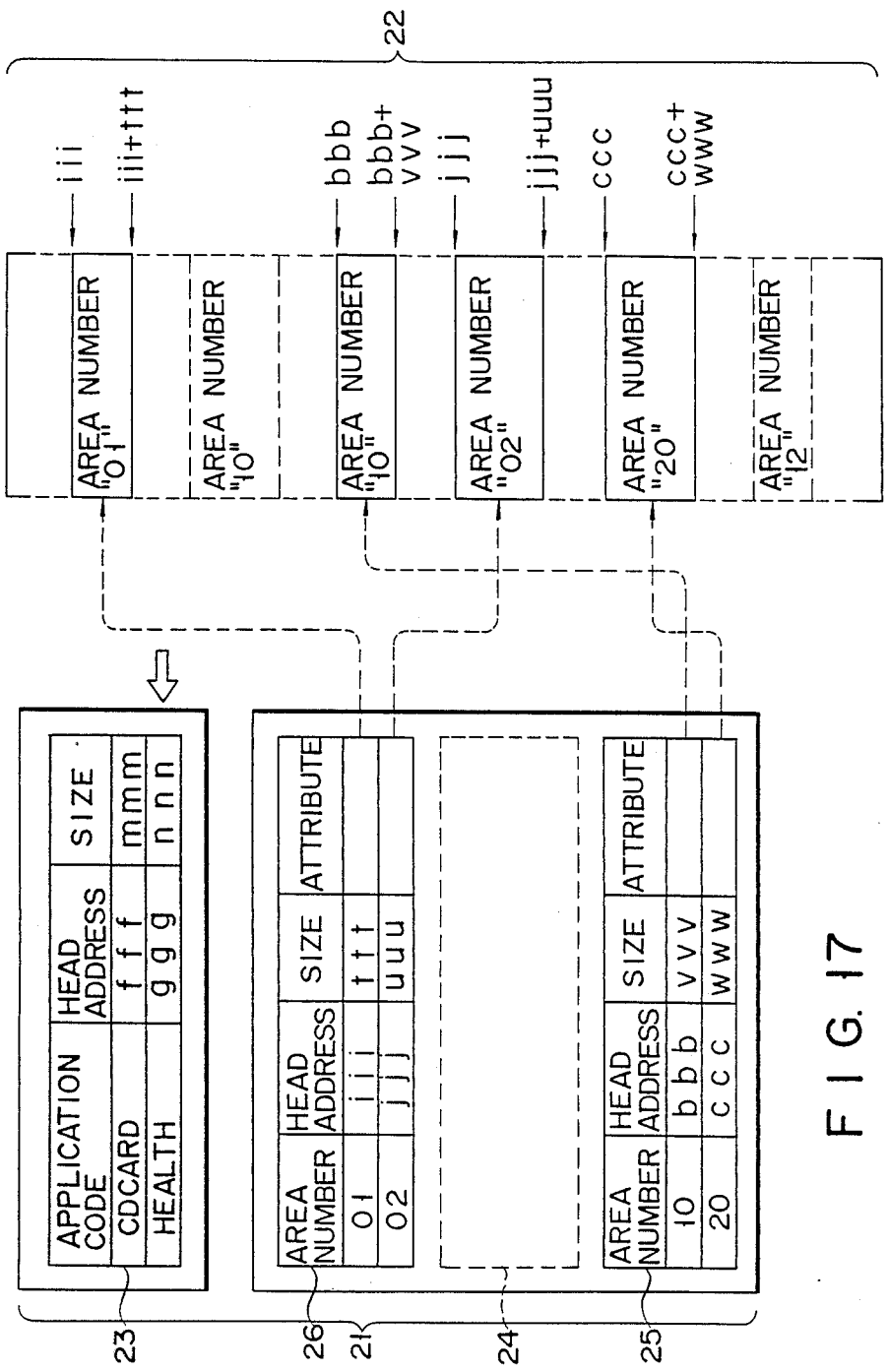
F I G. 17

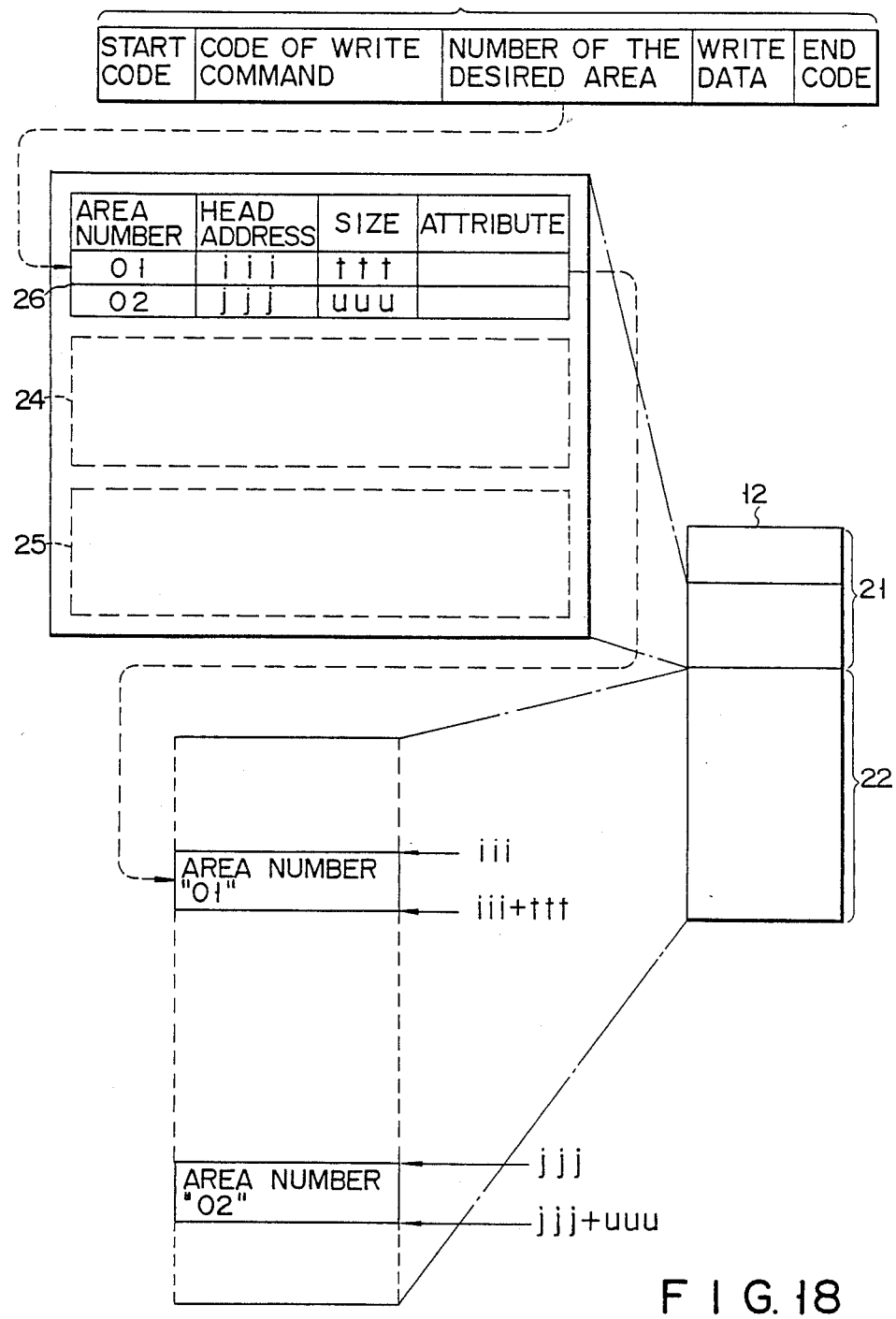
F I G. 18

MULTI-USE PORTABLE ELECTRONIC DEVICE

BACKGROUND OF THE INVENTION

The present invention relates to a portable electronic device, generally known as an "IC card", which contains an IC (Integrated circuit) chip having, for example, a non-volatile data memory and a control element such as a CPU, and, more particularly, to a system for controlling the data memory.

The development of a portable data-recording medium, the so-called "IC card", is a relatively recent event. This IC card contains an IC chip having a non-volatile data memory and a control element such as a CPU. The control element controls access to the data memory, thereby permitting pertinent data to be written into and to be read out from the data memory in accordance with a request fed thereinto via an external terminal device.

The data memory incorporated in the IC memory is divided into a plurality of areas each of which stores different items of data and is assigned a number known as an "area number". A logic access method is used to access the data memory by designating the number of any desired area of the data memory.

To perform the logic access method, the data memory is divided into two areas, i.e., a directory area and a user area. The user area is itself sub-divided into a plurality of areas for storing different items of data for various uses. The areas of the user area are defined by a plurality of region-defining data items stored in the directory area. Each area-defining data item comprises area number data representing the number of a user, area, head address data defining the position of the particular user area in the sub-divided user area, size data showing the size of the user area, and attribute data representing the use of the user area.

Hitherto, only one group of area-defining data items could be stored within an IC card. This did not matter previously, since at the time an IC card was limited in its range of uses. Today, however, there is general demand for an IC card which be used for a variety of purposes; for example, one which can be inserted in a cash dispenser (CD) terminal and thus used as a CD card, and which can also be inserted into a terminal installed in a hospital and used as a health insurance policy and medical record. When an IC card storing only one group of area-defining data items is to be used for such a variety of purposes, it is first necessary to:
(1) Assign area numbers identifying various uses to the user area; and
(2) Determine, by means of a terminal, whether or not the number assigned to any user area which is to be accessed, identifies the desired use.

Even if both actions (1) and (2) are carried out, the following problems still remain. First, IC card systems A and B, which have been independently developed for different purposes, cannot exchange data. (It is very probable that systems A and B use the same user area.) Secondly, the security of the data stored in any user area cannot be ensured, since the data input from system A can be stolen or altered by an authorized party operating system B; that is, the IC card is not protected against such illegal transactions.

SUMMARY OF THE INVENTION

Accordingly, the object of the present invention is to provide a portable electronic device which can be used for various purposes, cause no problems, maintain the security of the data stored in it, and require no modification of terminal devices.

According to this invention, there is provided a portable electronic device into which data can be input and from which data can be output, the device comprising: data memory means having at least a first area and a second area, the second area having a plurality of data-storing areas for storing data, and the first area having a directory area for storing data defining the data-storing areas of the second area, the data having a plurality of groups of area-defining data items, each group including at least one data item defining one data-storing area; selection means for selecting one of the groups of area-defining data items as a group defining areas which can be used; and control means for controlling the data memory means, thereby to store data supplied from an external device into, and to output data to the external device from, a selected one of the data-storing areas of the data memory means by the selection means.

BRIEF DESCRIPTION OF THE DRAWINGS

FIG. 4 is a flow chart explaining how the terminal device is operated when the IC card is used for various purposes;

FIG. 7 is a diagram illustrating the areas which can be accessed when the command for designating a group of area-defining data items is executed under the control of an application code "CDCARD";

FIG. 16 is a diagram illustrating the areas which can be accessed when the command for designating a group of area-defining data items is executed in the IC card of the second embodiment, under the control of an application code "CDCARD";

FIG. 17 is a diagram showing the areas which can be accessed when the command for designating a group of area-defining data items is executed in the IC card of the second embodiment, under the control of an application code "HEALTH";

FIG. 18 is a diagram schematically showing a write command input to the IC card when no areas of the data memory are designated for explaining how data is processed within the IC card when this write command is input to the IC card;

DETAILED DESCRIPTION OF THE PREFERRED EMBODIMENTS

One embodiment of the present invention will now be described with reference to the accompanying drawings.

Figure 1:
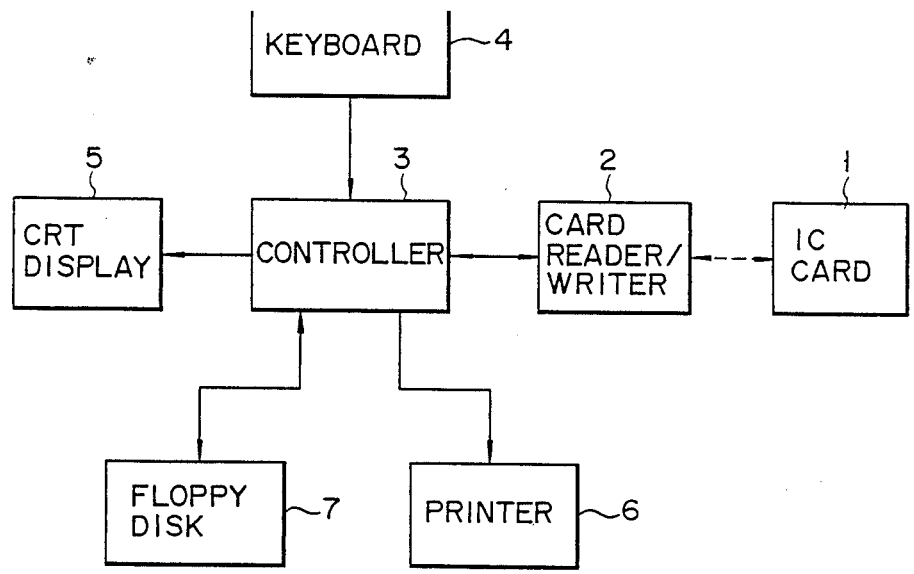
FIG. 1 is a block diagram showing a terminal device to which an IC card according to the present invention is connected when it is used.

FIG. 1 shows a terminal device to which an IC card, i.e., a portable electronic device according to the invention, is connected when it is used. This terminal device comprises card reader/writer 2, control section 3, keyboard 4, CRT display 5, printer 6, and floppy disk drive 7. IC card 1 can be coupled to card read/writer 2.

Figure 2:
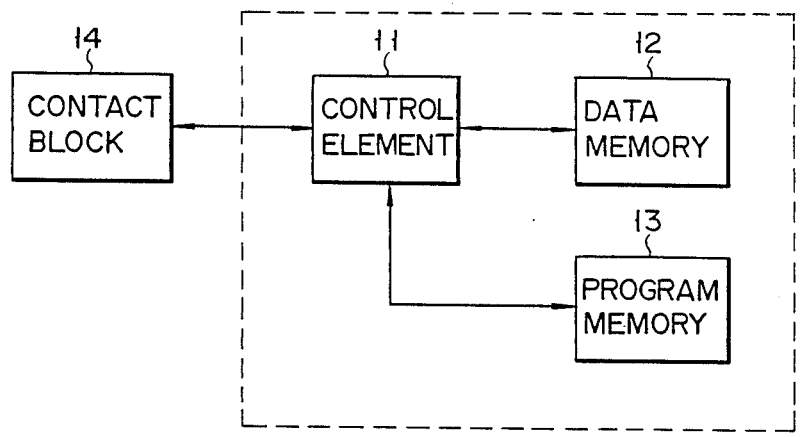
FIG. 2 is a block diagram representing the IC card according to this invention.

As is shown in FIG. 2, IC card 1 comprises control element 11 (e.g., a CPU), data memory 12, program memory 3, and contact block 14. Data memory 12 is a nonvolatile memory. Program memory 13 functions as a program memory section. Contact block 14 can be electrically connected with card reader/writer 2 of the terminal device. The components illustrated within the rectangle (drawn in broken lines), i.e., control element 1, data memory 12, and program memory 13, are incorporated in a single IC chip which is embedded within the body of IC card 1. Program memory 13 is, for example, a mask ROM, and stores a program for controlling control element 11. More specifically, it can be an EEPROM.

Figure 3:
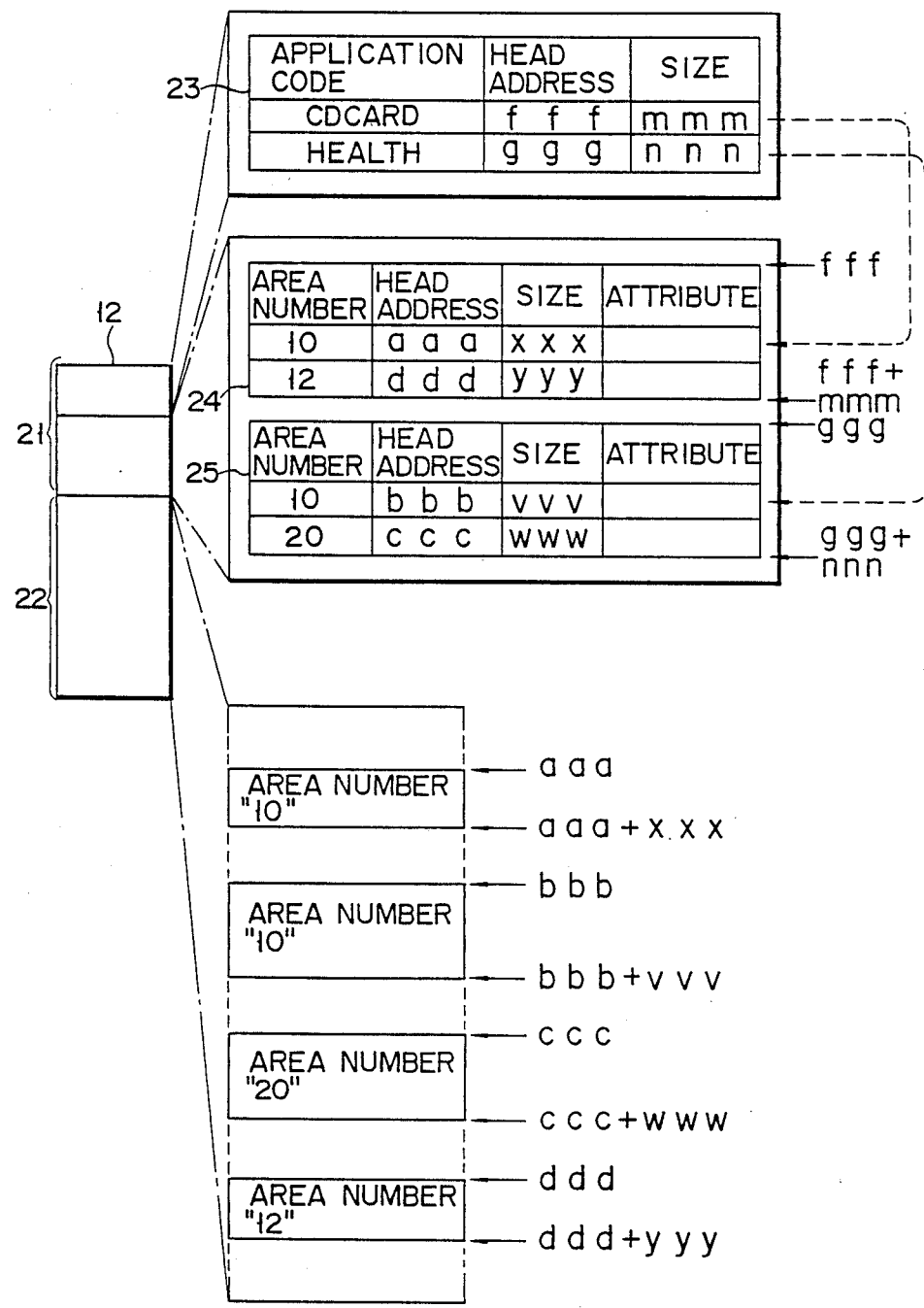
FIG. 3 shows the memory map of the data memory provided within an IC card according to a first embodiment of the present invention.

As is illustrated in FIG. 3, data memory 12 is comprised of two sections, i.e., directory area 21 and user area 22. Directory area 21 is divided into one area storing control data group 23 for controlling groups of area-defining data items, and two areas storing two groups 24 and 25 of area-defining data items. Control data group 23 defines the groups of area-defining data items of groups 24 and 25. Control data group 23 comprises application codes assigned to various uses of IC card 1, head addresses defining the positions of the groups of area-defining data items, and items of size data representing the sizes of the groups of area-defining data items. Application code CDCARD and the head address and size data, both relating to code CDCARD, define the group 24 of area-defining data items, so that IC card 1 can be used as a CD card. Application code HEALTH and the head address and size data, both relating to this code HEALTH, define the group 25 of area-defining data items, so that IC card 1 can be used as a health insurance policy and medical record.

User area 22 of data memory 12 is divided into a plurality of areas. These areas are defined or identified by the area-defining data items of groups 24 and 25 stored in directory area 21. Each area of user area 22 is defined by the data item of group 24 or 25, which comprises the data representing the number of the area, the head address defining the position of the area in user area 22, the size data representing the size of the area, and the attribute data specifying the use of the area. More precisely, first group 24 of area-defining data items, which is stored in directory area 21, is used to designate any area of user area 22 when the IC card is used as a CD card. Second group 25 of area-defining data items, which is stored also in directory area 21, is used to designate any area of user area 22 when IC card 1 is used as a health insurance policy and medical record.

In the instance shown in FIG. 3, first group 24 of area-defining data items, which includes application codes "CDCARD", designates two areas "10" and "12", in which the name and address of the IC card holder are stored, respectively. On the other hand, second group 25 of area-defining data items, which includes application codes "HEALTH", designates two areas "10" and "20", in which the name and medical record of the IC card holder are stored, respectively. Although the same number, "10", is designated by groups 24 and 25, no problems arise since these two areas are located at different positions in user area 22 as is illustrated in the memory map of FIG. 3.

Figure 5:
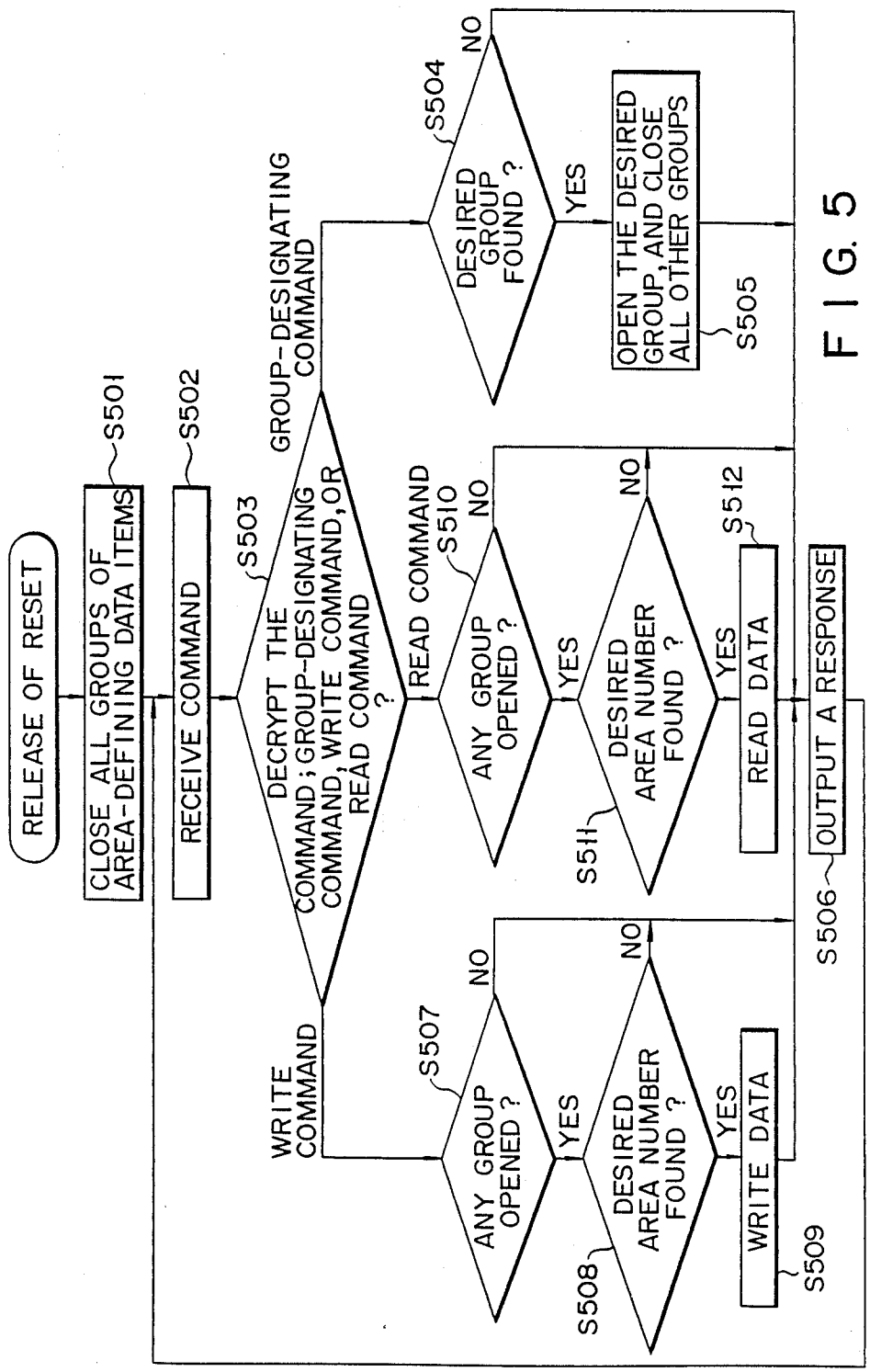
FIG. 5 is a flow chart explaining how data is processed within the IC card.

It will now be explained how IC card 1 is used for various purposes, with reference to FIGS. 4 and 5 and the other figures attached hereto. FIG. 4 is a flow chart illustrating the operation of the terminal device, and FIG. 5 is a flow chart explaining how data is processed within IC card 1.

Figure 6:
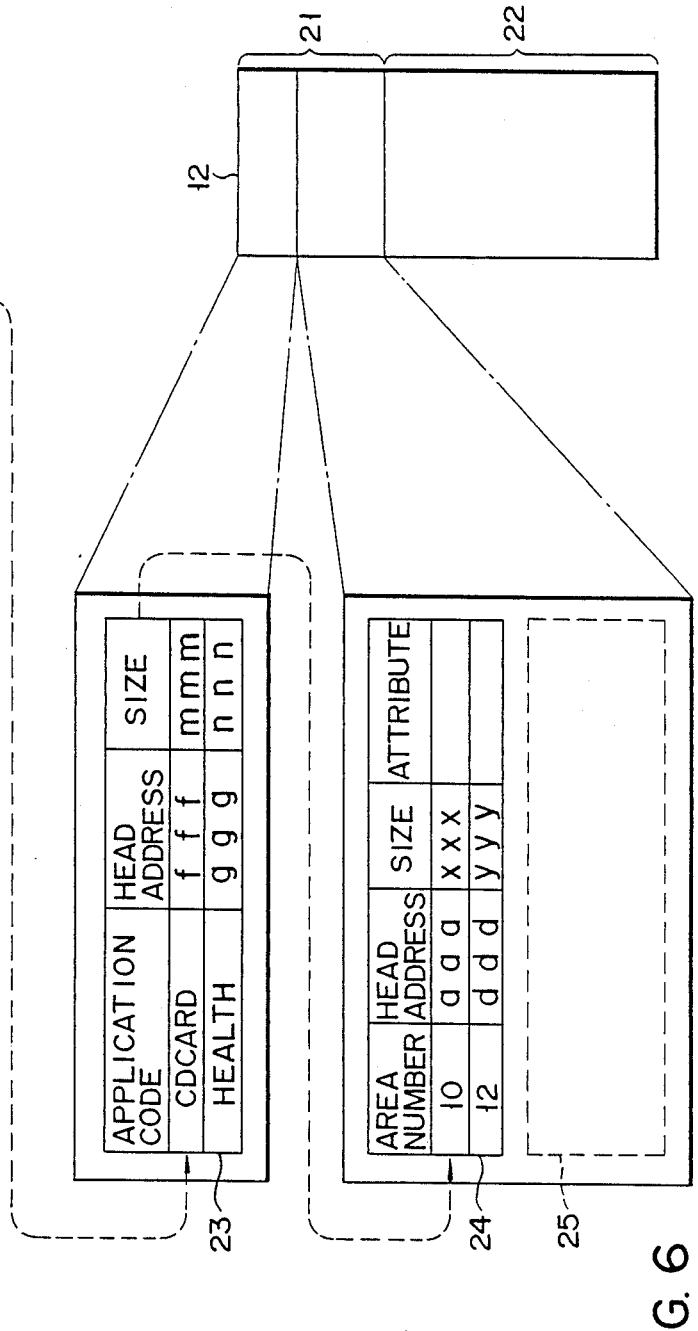
FIG. 6/is a diagram schematically showing a command for designating a group of area-defining data items and for explaining how data is processed within the IC card when this command is input to the IC card.

First, IC card 1 is inserted into card reader/writer 2 (step S401). Then, card reader/writer 2 automatically supplies power to IC card 1 and clock pulses thereto. Thereafter, control section 3 provided within the terminal device supplies a reset signal to IC card 1. This reset signal is a start control signal for IC card 1. When the reset signal is supplied to control element 11 of IC card 1, this element 11 is released from a reset condition, and begins to operate. That is, control element 11 closes all groups of area-defining data items (step S501). Then, control section 3 of the terminal device outputs a command to control element 11 of IC card 1 (step S402). This command designates one of the groups of area-defining data items. The command has such a format as is illustrated in FIG. 6.

IC card 1 receives the command (step S502). Control element 11 decrypts the command (step S503). If the decrypted command is one designating a group of area-defining data items, control element 11 finds, from among the data items of group 23, the area-defining control data item having the application code identical to the application code contained in the command message (step S504). Then, control element 11 opens the group of area-defining data items, which is identified by the area-defining control data item which has been thus found, and maintains all other groups in the closed condition (step S505). Only one group of area-defining data items can be opened at a time. In other words, the group designated by the command executed last is opened and, thus, valid, while all other groups are closed and invalid.

When none of the data items of group 23 is found to have the application code identical to the application code contained in the command message (step S504), control element 11 gives control section 3 of the terminal device a response informing that an unregistered code has been input (step S506).

FIG. 7 shows the areas which can be accessed when the application code "CDCARD" is selected for IC card 1 having the memory map of FIG. 3, and a command is executed for designating one of the groups of area-defining data items. As may be understood from FIG. 7, it is first group 24 of area-defining data items that can be opened. The two areas, numbered "10" and "12", respectively, can be accessed. It is second group 25 of area-defining data items that is closed. The two areas defined by this group 25, numbered "10" and "20", respectively, cannot be accessed.

Figure 8:
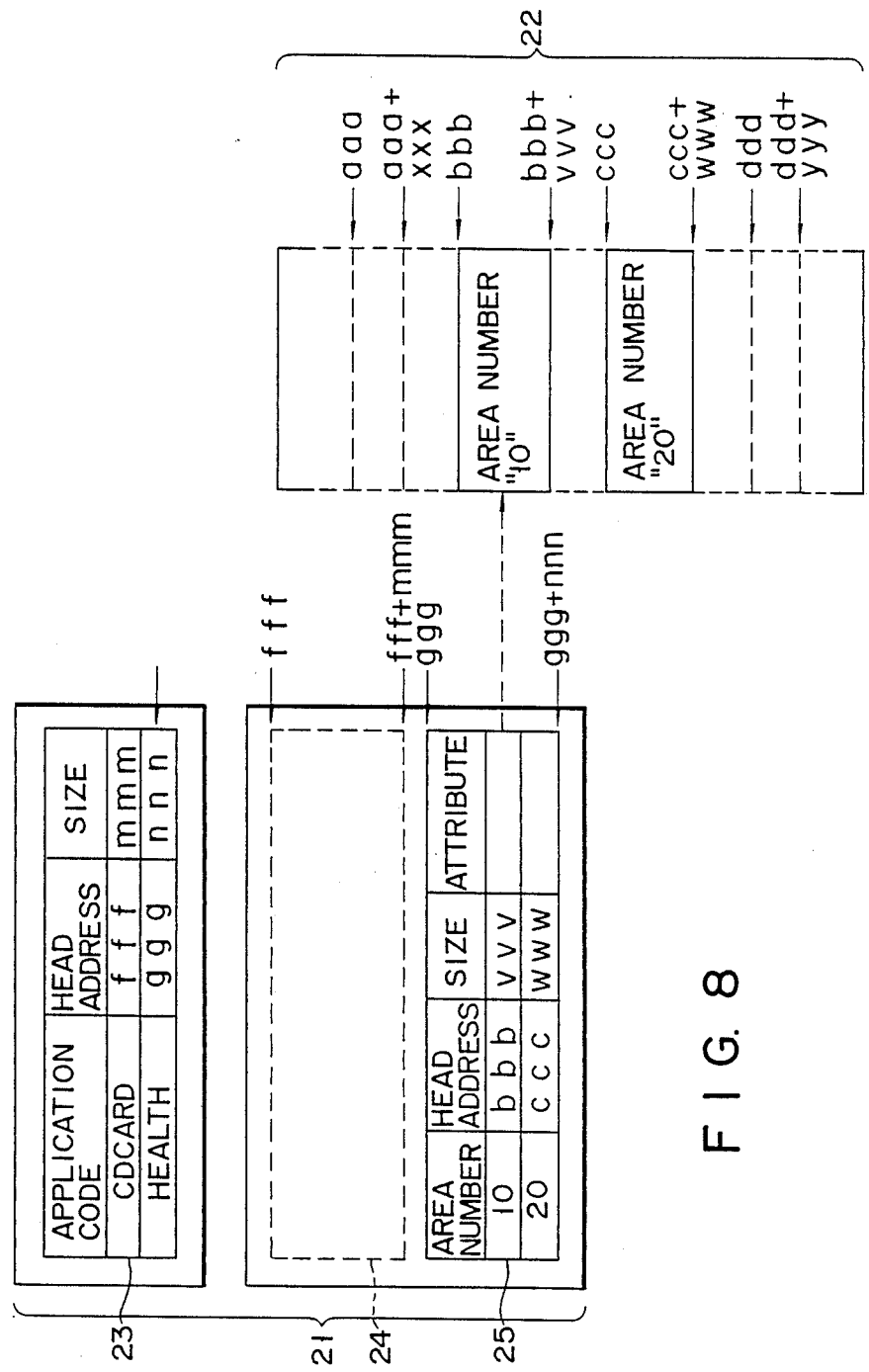
FIG. 8 is a diagram showing the areas which can be accessed when the command for designating a group of area-defining data items is executed under the control of an application code "HEALTH"

FIG. 8 shows the areas which can be accessed when the application code "HEALTH" is selected for IC card 1, and a command is executed for designating one of the groups of area-defining data items. As may be understood from FIG. 8, it is second group 25 of area-defining data items that can be opened. The two areas defined by this group 25, numbered "10" and "20", respectively, can be accessed. It is first group 24 of area-defining data items that is closed. The two areas defined by group 24, numbered "10" and "12", respectively, cannot be accessed It should be noted that first group 24 and second group 25 define areas of the same number, i.e., "10". When first group 24 is opened, area "10" designated by the head address "aaa" is accessible. On the other hand, when second group 25 is opened, area "10" designated by the head address "bbb" is accessible. That is, the areas which are defined by the area-defining data items of one group are numbered independently of the areas which are defined by the area-defining data items of any other group.

Figure 9:
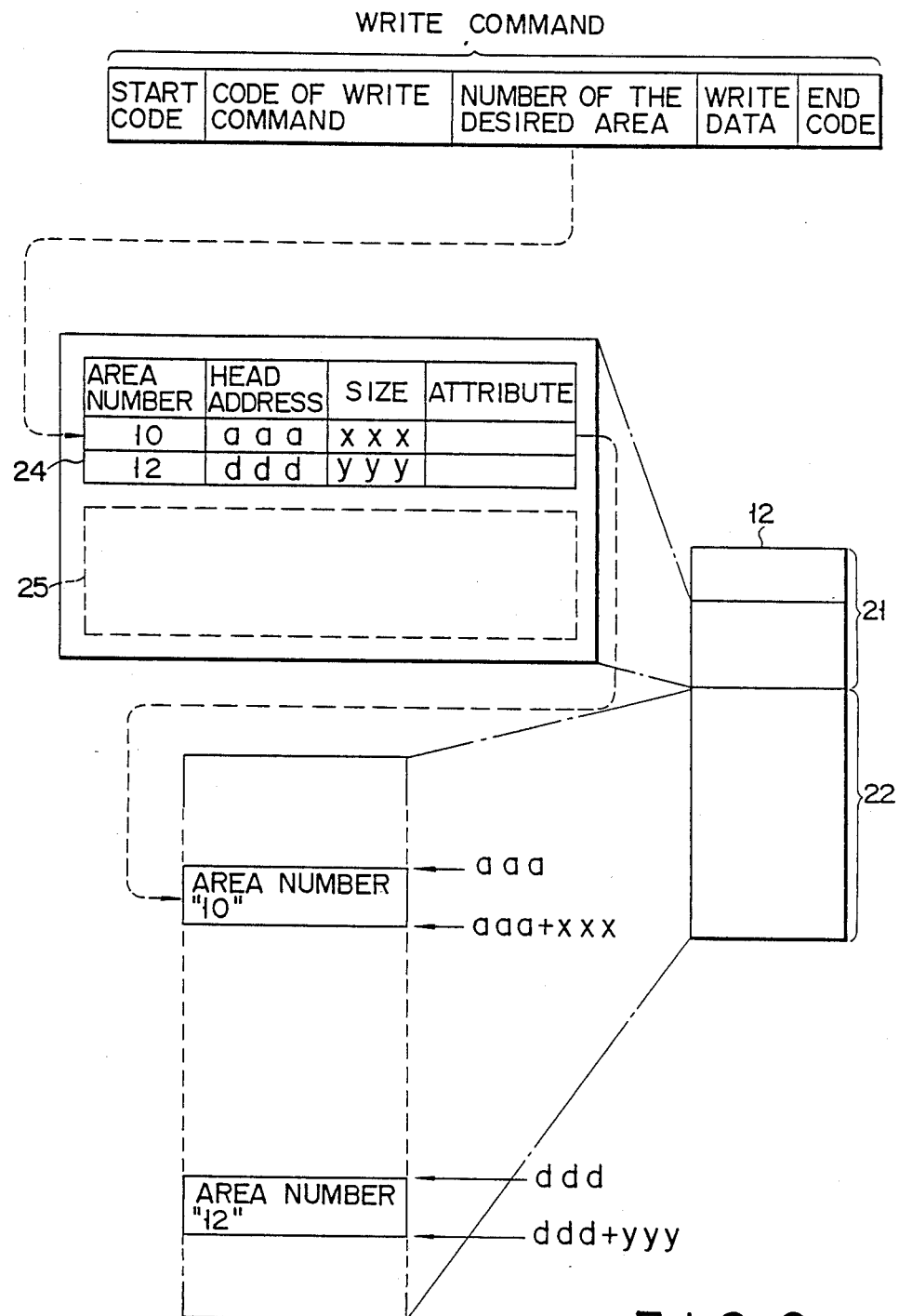
FIG. 9 is a diagram schematically showing a write command for explaining how data is processed within the IC card when the write command is input to the IC card.

Assuming that first group 24 of area-defining data items has been opened by the command, data is written into a selected one of the areas defined by the data items of first group 24, in the following manner. It is determined whether data should be read from, or written into, IC card 1 (step S403). Since data needs to be written into IC card 1 in this instance, control section 3 of the terminal device supplies a write command (FIG. 9) to control element 11 of IC card 1 (step S404). In IC card 1, it is determined whether or not any group of area-defining data items has been opened (step S507). If YES, control element 11 finds, from among the data items of first group 24, the area-defining data item having the area number identical to the area number identified by the area number data contained in the command message (step S508). Then, control element 11 makes an access to the area of data memory 12 in accordance with the head address and the size data, both contained in the area-defining data item which has been found. The write data contained in the command message is, thereby, written into the area of data memory 12 thus accessed by control element 11 (step S509).

When none of the area-defining data items of first group 24 is found in step S508 to have the area number identical to the area number identified by the area number data contained in the write command message, control element 11 gives control section 3 of the terminal device a response informing that none of the areas of data memory 12 has been defined by the area number data contained in the write command (step S506). When the command for designating a group of area-defining data items has not been correctly executed, or when no groups of area-defining data items have been designated by this command (step S507), control element 11 gives control section 3 a response informing that no groups of area-defining data items have been opened (step S506).

Figure 10:
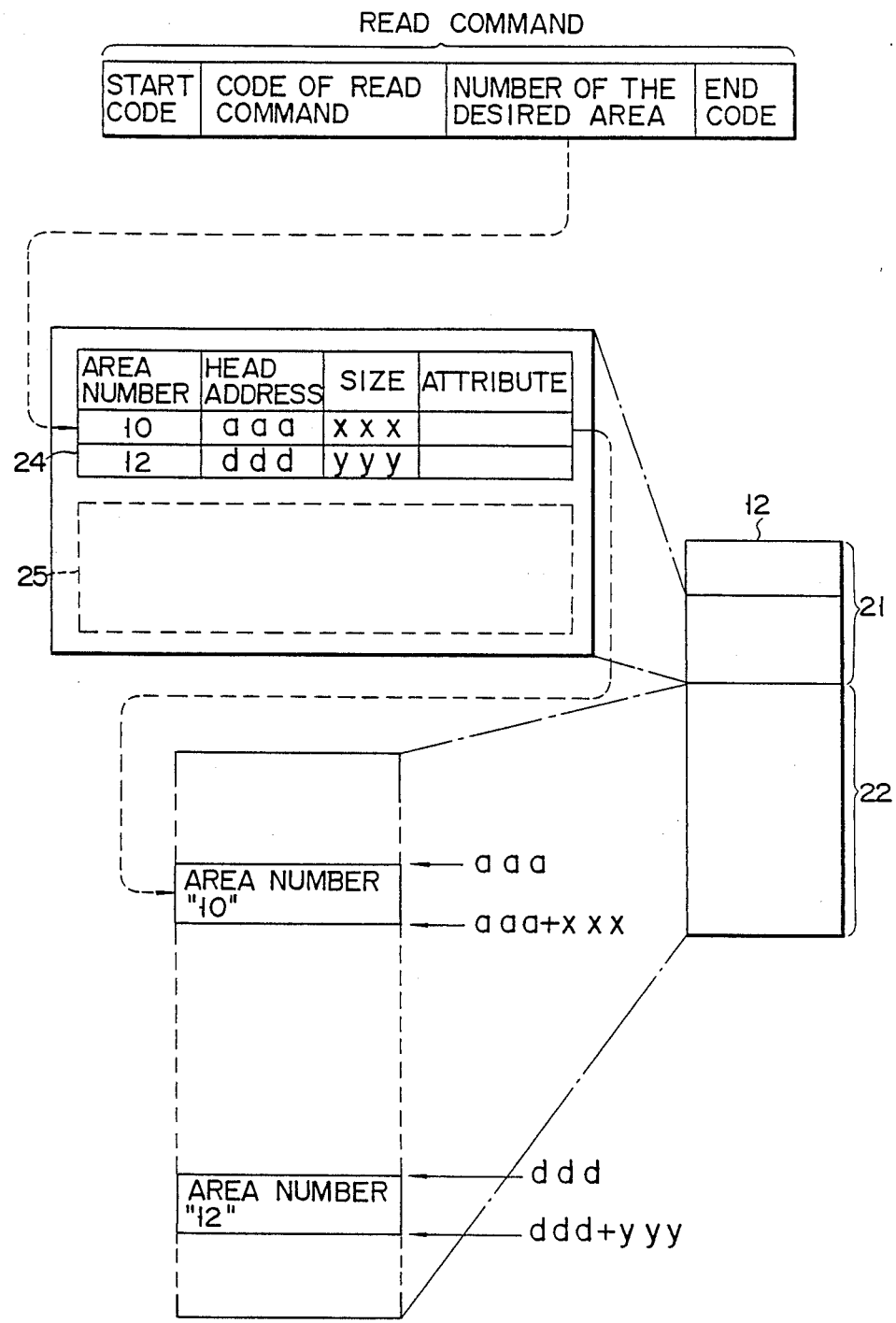
FIG. 10 is a diagram schematically showing a read command for explaining how data is processed within the IC card when the read command is input to the IC card.

Data is read out of IC card 1 in a manner similar to the way of writing data. More specifically, data is read from the IC card in the following way when first group 24 of area-defining data items has been opened in accordance with a command for designating groups of area-defining data items. First, control section 3 of the terminal device supplies a read command (FIG. 10) to control element 11 of IC card 1 (step S405). Upon receipt of this write command, control element 11 determines whether or not any group of area-defining data items has been opened (step S510). Since first group 24 has been opened in this instance, control element 11 finds, from among the area-defining data items of first group 24, the data item having the area number identical to the area number identified by the area number data contained in the area command message (step S511). Then, control element 11 makes an access to the area of data memory 12 in accordance with the head address and the size data, both contained in the area-defining data item which has been found. The data is thereby read from the area of memory 12, which has been thus accessed (step S512).

When none of the area-defining data items of firs group 24 is found in step S511 to have the area number identical to the area number represented by the area number data contained in the read command message, control element 11 gives control section 3 a response indicating that none of the areas of data memory 12 has been defined by the area number data contained in the read command (step S506). When the command for designating a group of area-defining data items has not been correctly executed, or when no groups of area-defining data items have been designated by the read command (step S510), control element 11 gives control section 3 a response informing that no groups of area-defining data items have been opened (step S506).

When the data has been written into IC card 1, or has been read therefrom, and no other data-processing is required, as is determined in step S406, IC card 1 is extracted from card reader/writer 2 (step S407).

Figure 11:
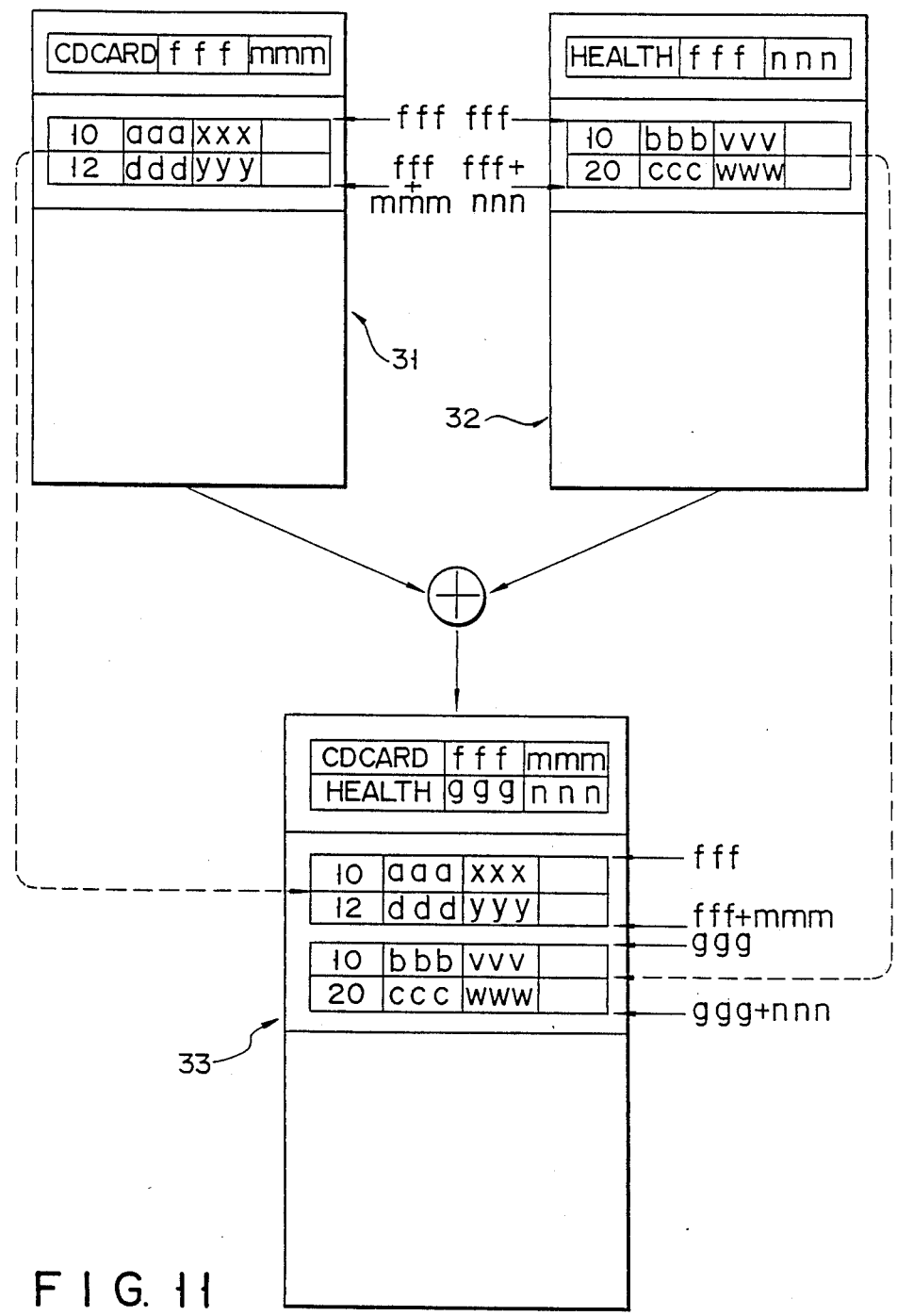
FIG. 11 is a diagram explaining how the data items stored in one-purpose IC card are transferred into a multi-purpose IC card.

IC card 1 according to the present invention, which has been designed for a single purpose, can be modified into a multi-purpose IC card, as will be explained with reference to FIG. 11. In this figure, numeral 31 denotes the data memory map of an IC card which is used as a CD card, and numeral 32 designates the data memory map of an IC card which is used as a health insurance policy and medical record. Numeral 33 represents the data memory map of an IC card which has been modified from either the IC card having memory map 31 or an IC card having memory map 32.

To modify the IC card having data memory map 31 into an IC card which has data memory map 33 and which can, thus, be used as a CD card and a health insurance policy and medical record, it suffices to write the data stored in the directory area of the IC card having memory map 32 into the directory area of the IC card having memory map 31 and to change head addresses, if stored in the IC card of memory map 32, which are identical to some of the head addresses stored in the IC card of memory map 31 so that two or more areas of the user area of the IC card having memory map 31 will not be simultaneously accessed. The IC card, thus modified, which has data memory map 33, can function as a CD card when it is inserted in a terminal device having application code "CDCARD", and as a health insurance policy and medical record when it is inserted in a terminal device having application code "HEALTH". Needless to say, the IC card having data memory map 32 can also be easily modified, in a similar way, into an IC card which has data memory map 33 and can thus be used not only as a health insurance policy and medical record, but also as a CD card.

Figure 12:
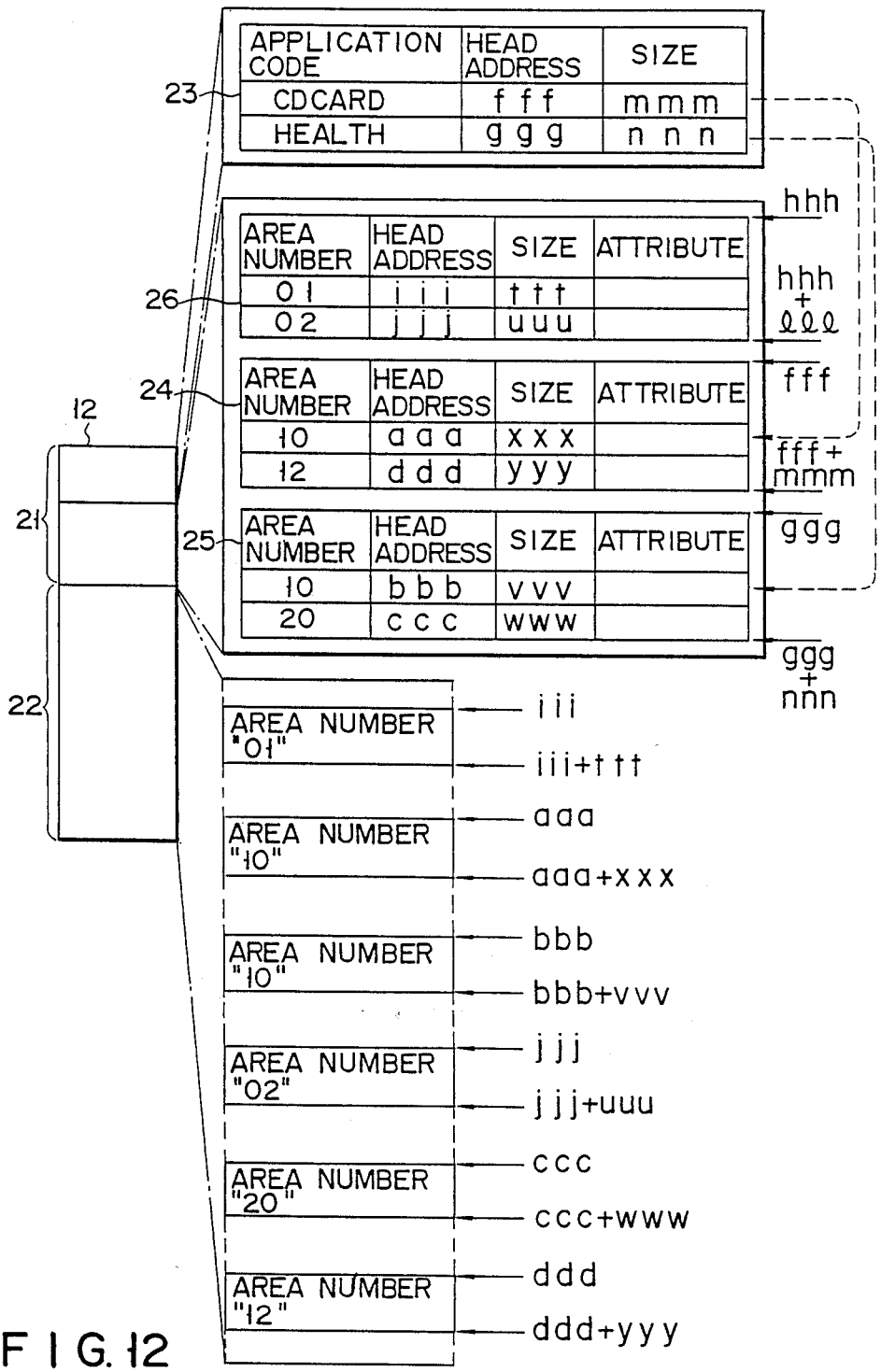
FIG. 12 shows the memory map of the data memory provided within an IC card according to a second embodiment of the present invention.

FIG. 12 shows the map of data memory 12 of an IC card according to a second embodiment of the present invention. This IC card can be used as a CD card and a health insurance policy and medical record, and the data common to both uses of the card, including the name, address and telephone number of the card holder, is stored in data memory 12.

As is shown in FIG. 12, the memory area of data memory 12 is divided into directory area 21 and a user area 22. Directory area 21 comprises one area storing control data group 23 for controlling groups of area-defining data items, and three areas storing three groups 24, 25 and 26 of area-defining data items. The data items of group 26 define the areas, numbered "01" and "02", respectively, storing the data common to both uses of the IC card. Groups 24 and 25 are defined by group 23. Control data group 23 comprises application codes (each being a code of 1 to 16 bytes) assigned to the uses of the IC card, head addresses defining the positions of groups 24 and 25 of area-defining data items, and items of size data representing the sizes of groups 24 and 25 of area-defining data items. More precisely, application code "CDCARD", and the head address and size data, both relating to code "CDCARD", define group 24 of area-defining data items, and application code "HEALTH", and the head address and size data, both relating to this code "HEALTH", define group 25 of area-defining data items.

User area 22 of data memory 12 is divided into a plurality of areas. These areas are defined or identified by the area-defining data items of groups 24 and 25 stored in directory area 21. Each area of user area 22 is defined by an item of group 24 or 25, which comprises the area number data representing the number of the area, the head address defining the position of the area in user area 22, the size data showing the size of the area, and the attribute data specifying the use of the area. More specifically, first group 24 of area-defining data items, which is stored in directory area 21, is used to designate any area of user areas 22 when the IC card is used as a CD card. On the other hand, second group 25 of area-defining data items, which is stored in directory area 21, too, is used to designate any area of user area 22 when the IC card is used as a health insurance policy and medical record.

The same area number, "10", is assigned to the two different areas of user area 21. This does not matter, since these two areas are located at different positions in user area 22 as is illustrated in FIG. 12. Further, the area numbers included in group 26 for defining the areas storing the data common to both uses of the IC card cannot be used in groups 24 and 25.

Figure 13A:
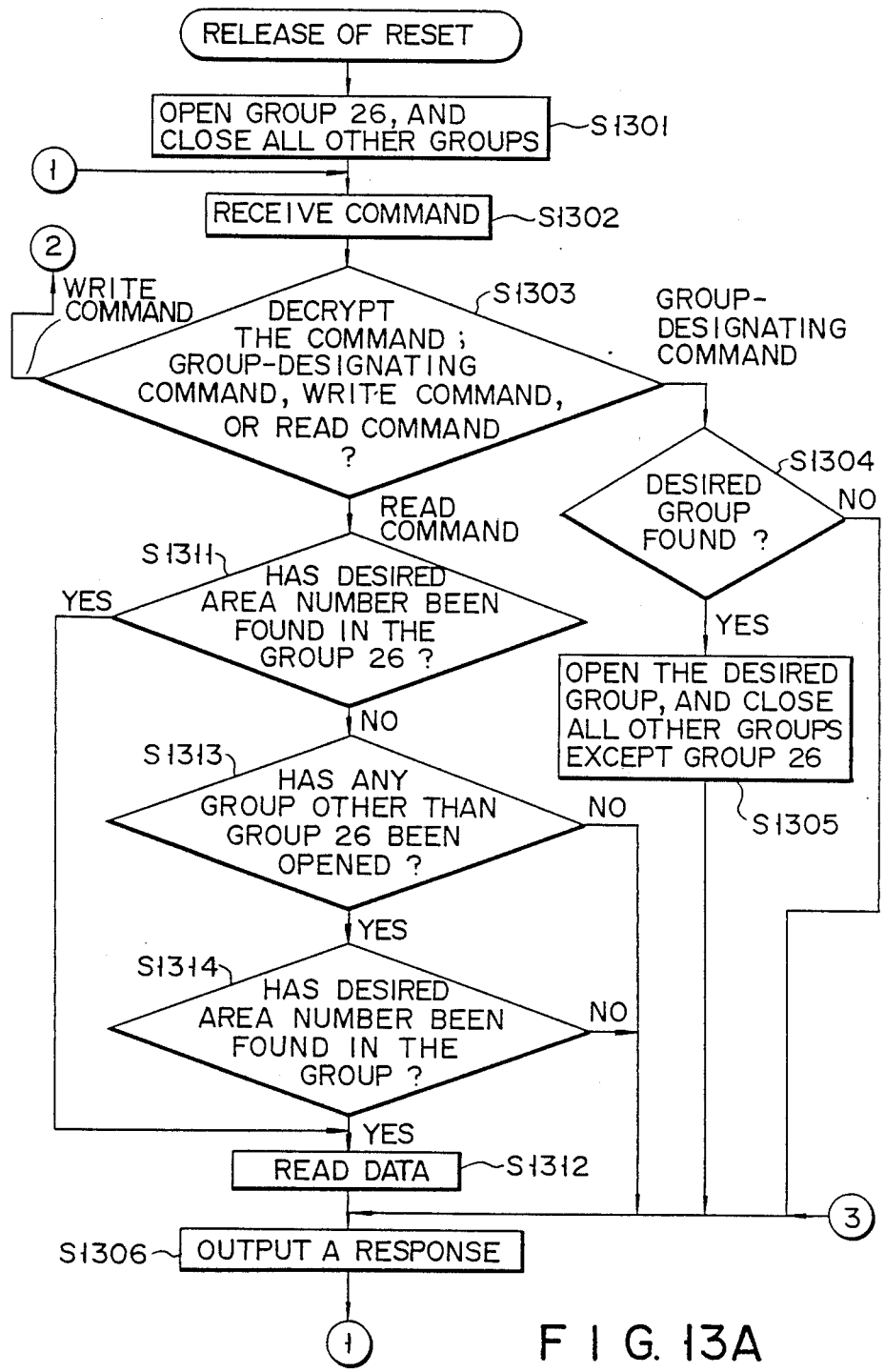
FIGS. 13A and 13B are flow charts explaining how data is processed within the IC card according to the second embodiment.
Figure 13B:
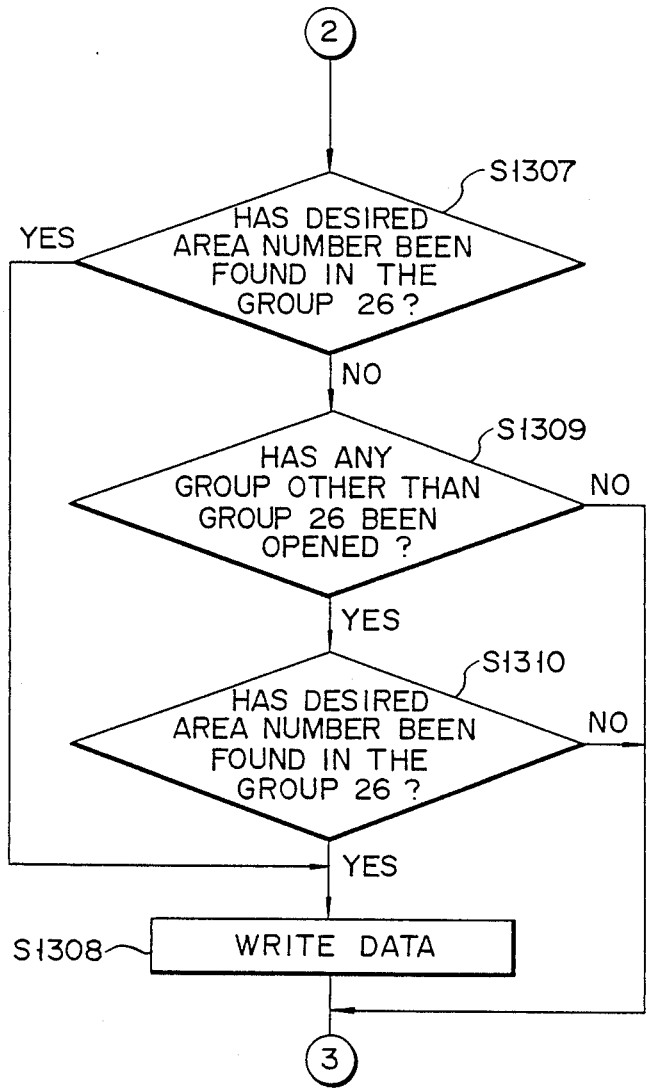

It will now be explained how the IC card of the second embodiment is used for various purposes, with reference to the flow charts of FIGS. 4, 13A, and 13B, and to FIGS. 14 to 21. As has been stated, FIG. 4 shows how the terminal device of FIG. 1 operates. FIGS. 13A and 13B illustrate how data is processed within the IC card while the IC card is inserted in the terminal device.

Figure 14:
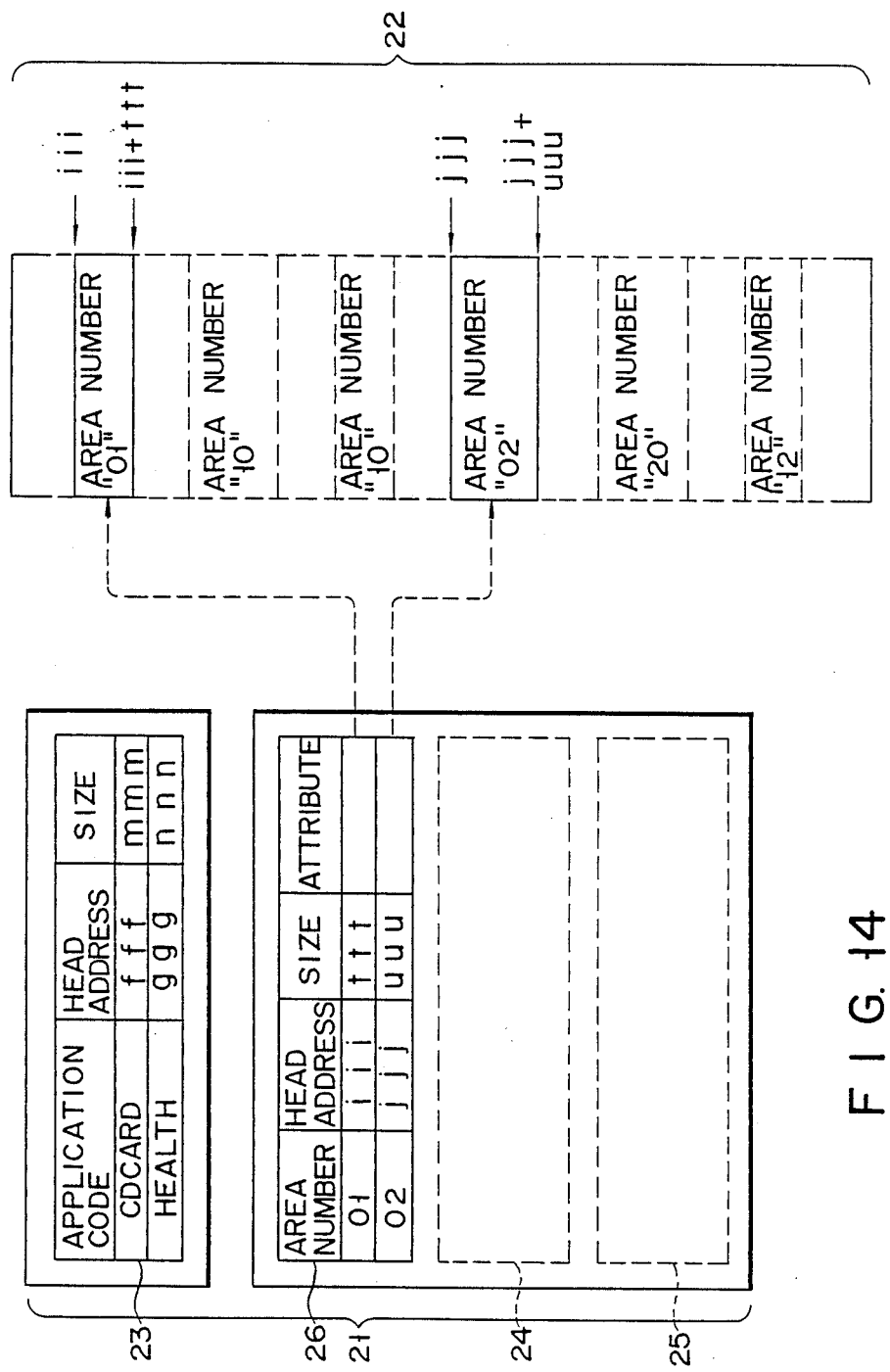
FIG. 14 is a diagram showing the areas which can be accessed when no command is executed to designate a group of area-defining data items.

First, IC card 1 is inserted into card reader/writer 2 of the terminal device (step S401). Then, card reader/writer 2 supplies power to IC card 1 and clock pulses thereto. Thereafter, control section 3 of the terminal device supplies a reset signal to IC card 1, thereby putting the IC card into operation. At this time, control element 11 of IC card 1 opens group 26 of area-defining data items and closes other groups 24 and 25 of area-defining data items (step S1301), as is illustrated in FIG. 14. Hence, the areas defined by area numbers "01" and "02" included in group 26 of area-defining data items can be accessed.

Figure 15:
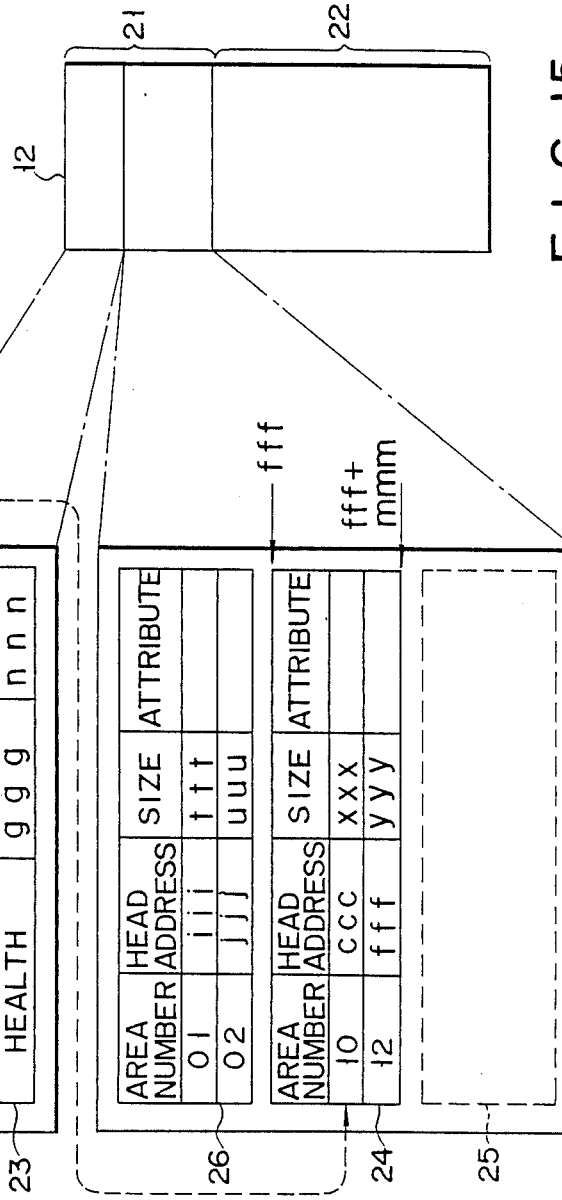
FIG. 15 is a diagram schematically showing a command for designating a group of area-defining data items for explaining how data is processed within the IC card according to the second embodiment when this command is input to the IC card.

In this condition, control section 3 of the terminal device outputs a command to control element 11 of IC card 1 (step S402). This command designates one of the groups of area-defining data items. The command has such a format as is illustrated in FIG. 15.

IC card 1 receives the command (step S1302). Control element 11 decrypts the command (step S1303). If the decrypted command is one designating a group of area-designating data items, control element 11 finds, from among the data items of control data group 23, the area-defining control data item having the application code identical to the application code contained in the command message (step S1304). Element 11 then opens the group of area-defining data items, which is identified by the area-defining control data item which has been thus found, and closes all other groups, except group 26 (step S1305). Group 26 and only another group of area-defining data items can be opened at a time. In other words, group 26 and the group designated by the command executed last are opened and, thus, valid, while all other groups are closed and invalid.

When none of the data items of group 23 is found, in step S1304, to have the application code identical to the application code contained in the command message, control element 11 gives control section 3 a response informing that an unregistered code has been input (step S1306).

FIG. 16 shows the areas which can be accessed when the application code "CDCARD" is selected for the IC card having the memory map of FIG. 12, and a command is executed for designating one of the groups of area-defining data items. As is evident from FIG. 16, it is group 26 and first group 24 that are opened, and it is second group 25 that is closed. The areas, numbered "01", "02", "10", and "12", which are defined by the data items of groups 24 and 26, can be accessed, whereas the areas, numbered "10" and "20", which are defined by the data items of group 25, cannot be accessed.

FIG. 17 shows the areas which can be accessed when the application code "HEALTH" is selected for the IC card, and a command is executed for designating one of the groups of area-defining data items. As may be understood from FIG. 17, it is group 26 and second group 25 that are opened, and it is first group 24 that is closed. The areas, numbered "01", "02", "10", and "20" which are defined by the data items of groups 25 and 26, can be accessed, whereas the areas, numbered "10" and "12" which are defined by the data items of first group 24, cannot be accessed.

As has been described, group 26 of data items defining the areas storing the data common to the uses of the IC card remains open, and is never closed, as long as IC card 1 is operated. Further, first group 24 and second group 25 define areas of the same number, i.e., "10". When first group 24 is opened, area 10 designated by the head address "aaa" is rendered accessible. On the other hand, when second group 25 is opened, area 10 designated by the head address "bbb" is made accessible. That is, the areas, which are defined by the area-defining data items of one group are numbered independently of the areas which are defined by the area-defining data items of any other group.

Assuming that no command has been executed to designate any group of area-designating data items, except for group 26, and only group 26 is therefore opened as is illustrated in FIG. 18, data is written into IC card 1, in the following manner. In the terminal device, it is determined whether data should be written into, or read from, the IC card (step S403). Since data is to be written into the IC card in this instance, control section 3 of the terminal device supplies a write command (FIG. 18) to control element 11 of IC card 1 (step S404). Then, control element 11 finds, from among the area-defining data items of group 26, the data item which has the area number identical to the area number contained in the command message (step S1307). In accordance with the head address and size data included in the area-defining data item thus found, control element 11 makes an access to the desired area, and writes the data contained in the command message in this area (step S1308).

When the area number contained in the command message is identical to with none of the area numbers contained in the area-defining data items of group 26, control element 11 gives control section 3 a response informing that none of the area numbers contained in the data items of group 26 has been identified by the write command (step S1306).

Figure 19:
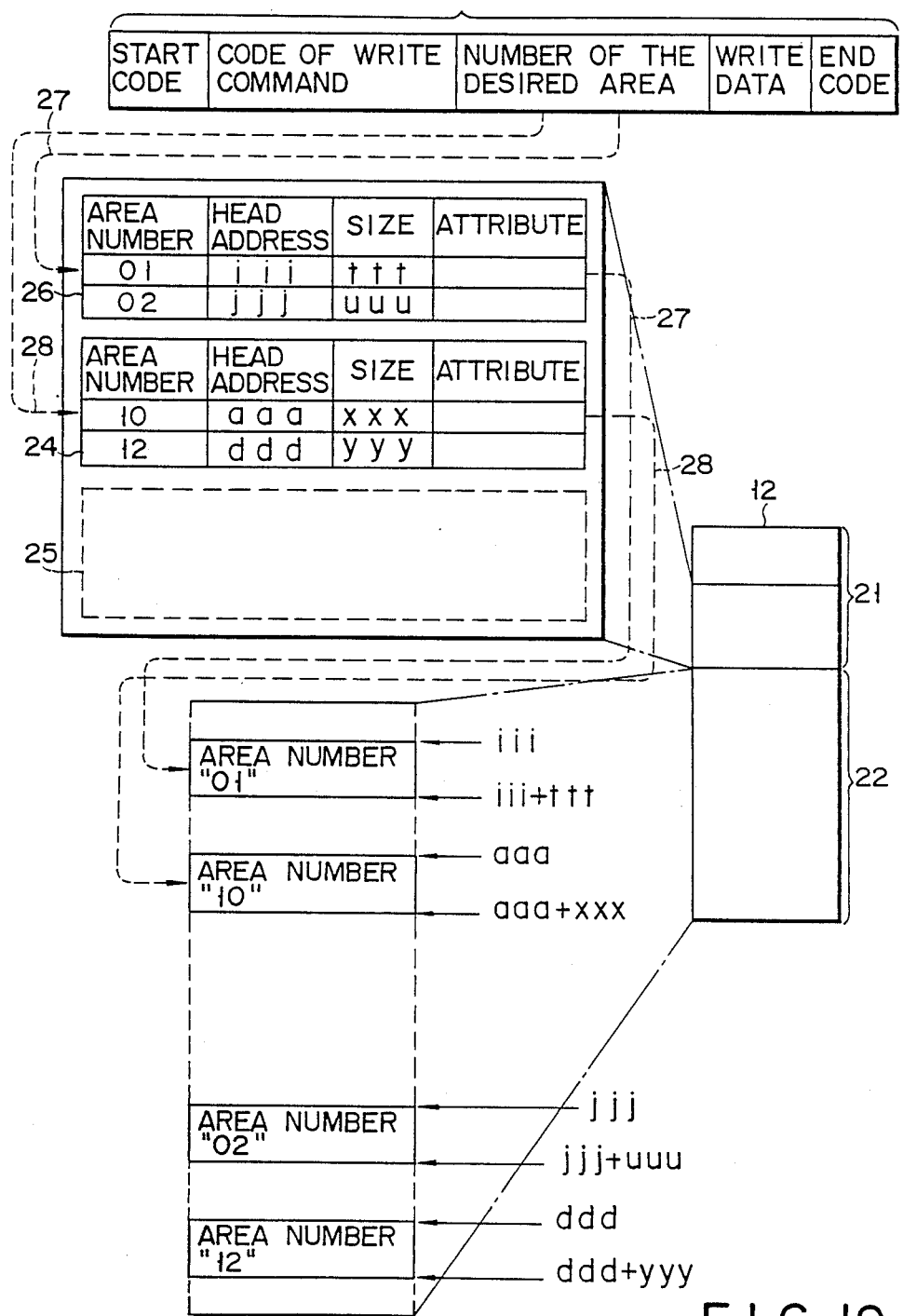
FIG. 19 is a diagram illustrating a write command input to the IC card when any area of the data memory is designated for explaining how data is processed within the IC card when this write command is input to the IC card.

It will now be described how IC card 1 is operated when a write command is supplied to the IC card, thereby to designate and open group 26 and either first group 24 or 25. Let us assume that a command designating the application code "CDCARD" is supplied to IC card 1 (step S404). Then, group 26 and first group 24 are opened as is illustrated in FIG. 19. The write command has the format shown in FIG. 19. Upon receipt of this write command, control element 11 finds, from among the data items of group 26, the area-defining data item having the area number identical to the area number contained in the command message (step S1307). When none of the area-defining data items of group 26 is identical to the area number contained in the command message control element 11 determines whether or not any group of area-defining data items, other than group 26 has been opened (step S1309). If YES, element 11 finds, from among the data items of the other group, the area-defining data item having the area number identical to the area number contained in the command message (step S1310). More precisely, in this particular instance, control element 11 finds such data item from among the area-defining data items of first group 24.

When the area number contained in the command message is "01", control element 11 makes an access to area No. 01 defined by the data item of group 26, and writes the data contained in the command message in area No. 01, as is indicated by broken line 27 (step S1308). On the other hand, when the area number contained in the command message is "10", control element 11 makes an access to area No. 10 defined by the data item of first group 24, and writes the data contained in the command message in area No. 10, as is represented by broken line 28 (step S1308).

If the area number contained in the command message is found, in step S1310, to be identified by neither group 26 nor first group 24, control element 11 gives control section 3 of the terminal device a response informing that the area number has not been identified (step S1306). If it is found, in step S1309, that no groups of area-defining data items have been designated, or the command has not been correctly executed to designate and open any group of area-defining data items, control element 11 gives control section 3 a response informing that no groups have been opened (step S1306).

Figure 20:
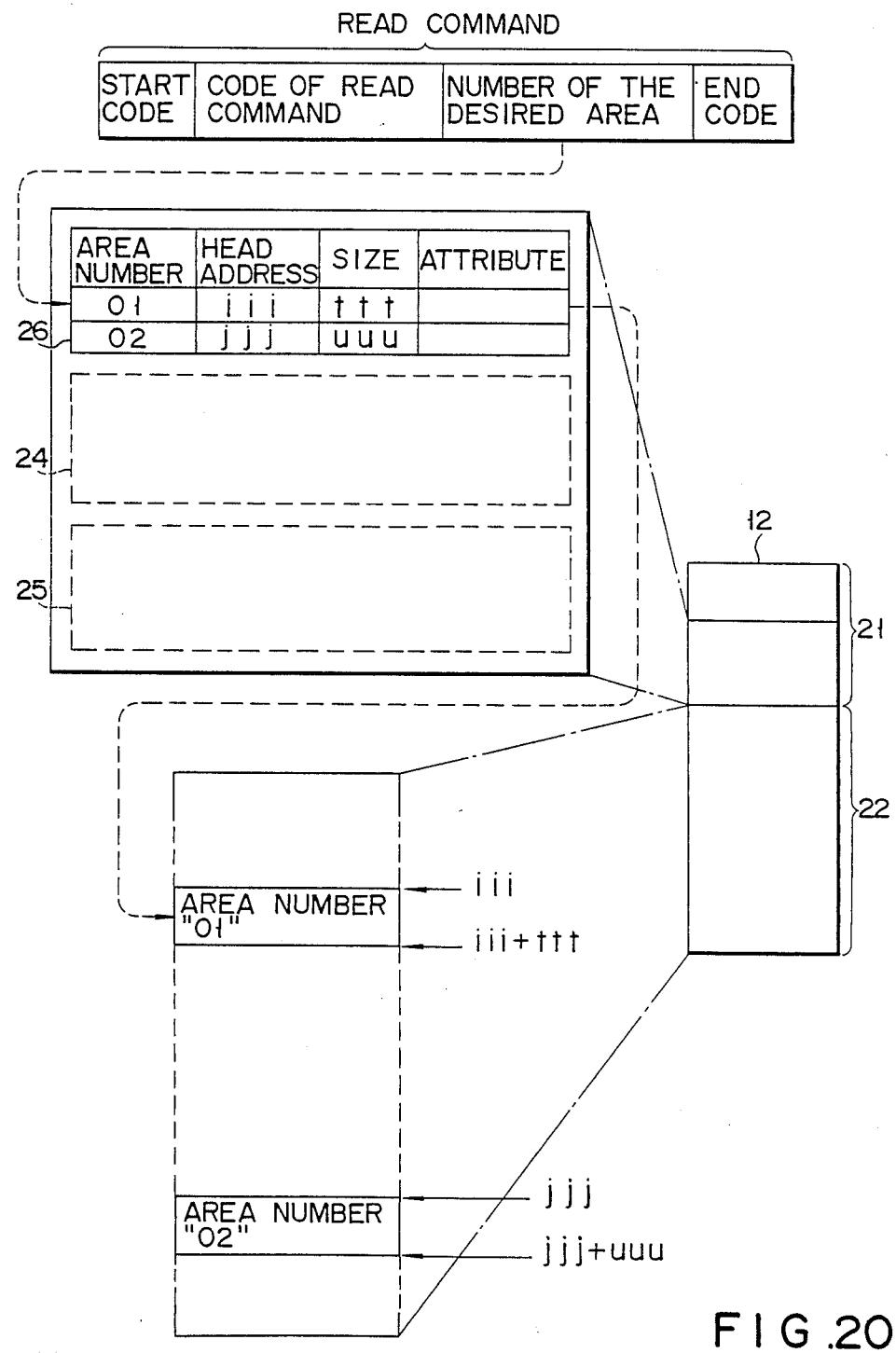
FIG. 20 is a diagram schematically representing a read command input to the IC card when no areas of the data memory are designated for explaining how data is processed when this read command is input to the IC card.

Data can be read out from the IC card of the second embodiment in a manner similar to the way of writing data into this IC card. It will now be explained how data is read from IC card 1 when group 26 has been opened, but neither first group 24 nor second group 25 has been designated, as is illustrated in FIG. 20. First, it is determined whether data should be written into, or read out of, IC card 1 (step S403). In this instance, control section 3 of the terminal device supplies a read command having the format shown in FIG. 20 to control element 11 of IC card 1 (step S405). Then, control element 11 finds, from among the data items of group 26, the area-defining data item having the area number identical to the area number contained in the read command message (step S1311). Control element 11 makes an access to the area identified by the area number contained in the command message, and reads data from this area (step S1312).

When the area number contained in the read command message is found, in step S1311, to be identical to none of the area numbers contained in group 26, control element 11 gives control section 3 a response showing that the area number has not been identified (step S1306).

Figure 21:
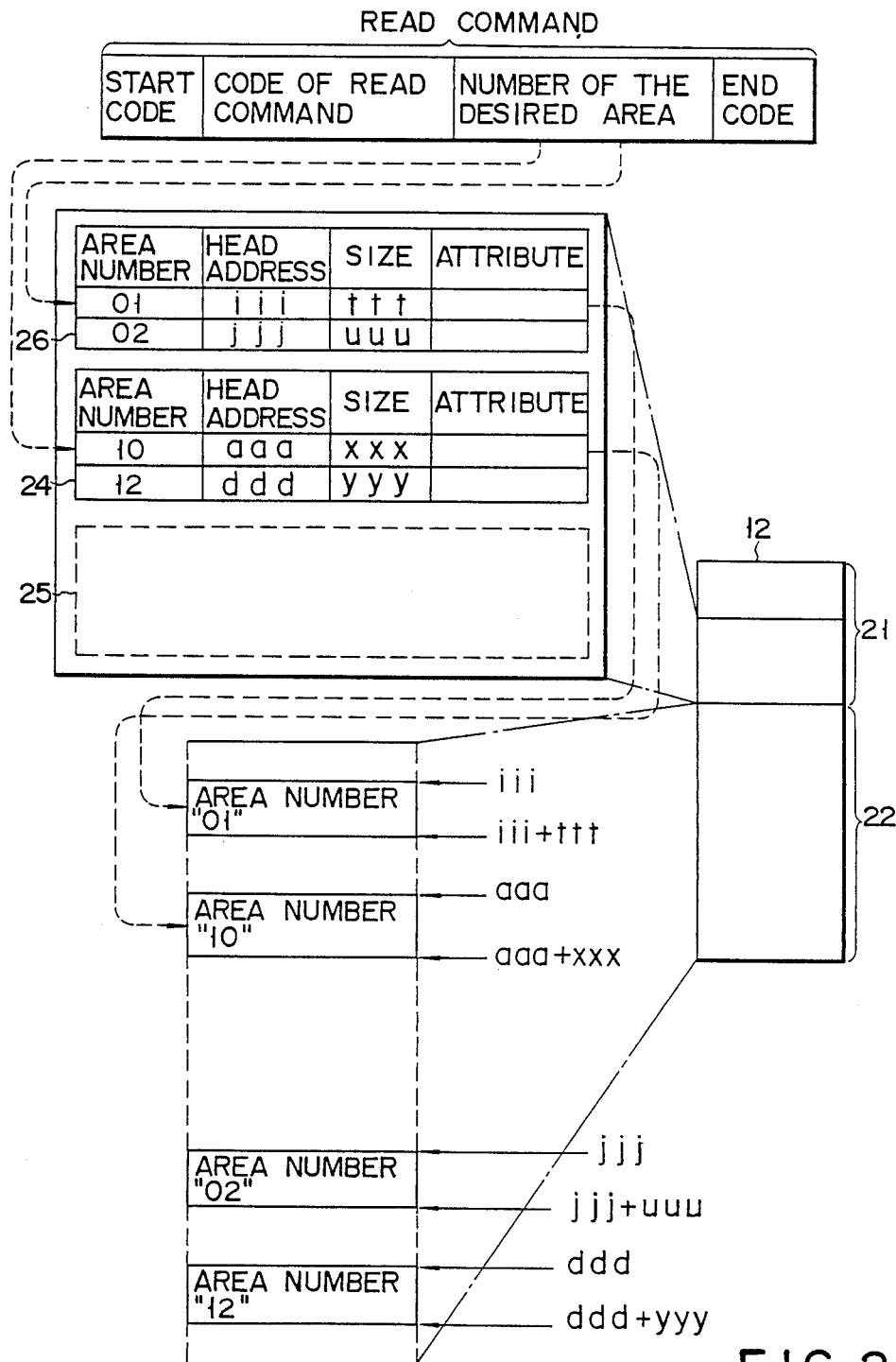
FIG. 21 is a diagram schematically showing a read command input to the IC card when any area of the data memory is designated for explaining how data is processed within the IC card when this read command is input to the IC card.

It will now be described in detail how the IC card is operated when a read command designating the application code "CDCARD" is supplied from the terminal device to the IC card. In this case, control element 11 opens group 26 and first group 24, as is illustrated in FIG. 21. More specifically, control section 3 of the terminal device determines whether data should be written into, or read from, the IC card (step S403), and then supplies the read command of the format shown in FIG. 21 to control element 11 of IC card 1 (step S405). Upon receipt of the read command, control element 11 finds, from among the data items of group 26, the area-defining data item having the area number identical to the area number contained in the read command message (step S1311). If the area number contained in the command message is found to be identical to none of the area numbers contained in group 26, control element 11 determines whether not any group other than group 26 has been opened (step S1313). If YES, element 11 finds, from among the data items of the other group, the area-defining data item having the area number identical to the area number contained in the command message (step S1314). In this specific instance, control element 11 finds such data item from among the area-defining data items of first group 24.

More precisely, when the area number contained in the read command message is "01", control element 11 accesses area No. 01 defined by the data item of group 26, and reads out the data from area No. 01 (step S1312). On the other hand, when the area number contained in the message is "10", control element 11 makes an access to area No. 10 defined by the data item of first group 24, and reads out the data from area of area No. 10 (step S1312).

If the area number contained in the read command message is found, in step S1314, to be identified by neither group 26 nor group 24, control element 11 gives control section 3 a response informing that the area number has not been identified (step S1306). If it is determined, in step S1313, that no groups of area-defining data items have been designated, or the read command has not been correctly executed, to designate and open any group of area-defining data items, control element 11 gives control section 3 a response informing that no groups have been opened (step S1306).

In the first embodiment and the second embodiment, both described above, the directory area and the user area are provided on the same data memory, and each is logically divided into a plurality of areas in accordance with a specific mask program. While making an access to a desired user area, the control element of the IC card. i.e., the CPU, will make an error with all probability, thereby to access the directory areas unnecessarily. To avoid such unnecessary accessing of directory areas, the memory cells forming the directory area are physically separated from the memory cells forming the user area, and protected from erroneous writing of data. In particular, when the data memory is an EEPROM, the memory can be set, by mistake, to the chip-erasing mode. When the data memory is set to this mode, not only the data stored in the user area, but also the data stored in the directory area will be destroyed, and the IC card will be no longer usable, if the directory area is separated from the user area only logically. If the directory area is physically separated from the user area, the data stored in the directory area will not be erased, though the data stored in the user area is destroyed, when the data memory is set, by mistake, to the chip-erasing mode. In this case, the IC card can be used.

When the IC card is used as a CD card, and high security must therefore be provided for the data stored in the directory areas of the data memory contained in the IC card, the directory area of the memory can be composed of a ROM. If this is the case, the data stored in the directory area can neither be rewritten nor altered after the IC card has been issued. In contrast, when the IC card is used for such a purpose that no high security is required for the data stored in the directory area, then the directory area can be made of an EEPROM. In this case, the data stored in the directory area can be rewritten, and the IC card can, therefore, be reissued and is quite economical.

Both embodiments of the present invention, described above, are IC cards. The portable electronic device of this invention is not limited to a card-shaped one. It can be provided in the form of a block or a pencil. In addition, the hardware structure of the portable electronic device can be change or modified, without departing from the scope of the present invention.

As has been described in detail, the directory area of the data memory contained in the portable electronic device of this invention can has a plurality of groups each comprising area-defining data item, and any one of these groups can be selected and used. Therefore, a terminal device need not control the data used in the IC card, such as area numbers, so that the work load of the terminal device is reduced. Further, the portable electronic device can be used for various purposes, not only safely but also easily.

Furthermore, at least one of the groups of area-defining data items can be designated and opened, independently of the other groups or area-defining data items. Hence, when the data items of this group define those areas wherein the data common to the various uses of the portable electronic device is stored, these areas can be accessed in the same way as the other areas which have been defined by the data items of any other group that has been designated and opened. Therefore, the areas in which the data common to the various uses of the device is to be written, or from which this data is to be read out, can be accessed without performing special preliminary data-processing, and the application programs need not be complex. As a result, data can be processed at high speed within the portable electronic device.

What is claimed is:

1. A portable electronic device into which data can be input and from which data can be output, said device comprising:

data memory means having at least a first area and a second area, said second area having a plurality of data-storing areas for storing data, and said first area having a directory area for storing pointer data pointing to the data-storing areas of the second area, said pointer data being divided into a plurality of groups of area-defining data pointers, each group including at least one data pointer which defines one data-storing area;

selection means for selecting one of the groups of area-defining data pointers as a group pointing to data-storing areas which can be used; and control means for controlling said data memory means so as to store data supplied from an external device into, and to output data to the external device from, a selected one of the data-storing areas of said data memory means pointed to by the selected group of area-defining data pointers.

2. The device according to claim 1, wherein said selection means stores a group of data pointers pointing to said groups of area-defining data pointers and selects one of said groups of area-defining data pointers, which has been designated by the external device, as the group defining the data-storing areas which can be used.

3. The device according to claim 2, wherein said data pointers pointing to the data-storing areas include area number data representing a data-storing area, head address data defining the position of the data-storing area in said second area, and size data representing the size of the data-storing area.

4. The device according to claim 2, wherein said data pointers pointing to said groups of area-defining data pointers include code data representing the code of a group of area-defining data pointers, head address data defining the position of the group in said directory area, and size data representing the size of the group, and said selection means selects, from among said groups of area-defining data pointers, the group having a code identical to a code supplied from the external device as the group defining the data-storing areas which can be used.

5. The device according to claim 1, wherein said selection means selects at least one of said groups of area-defining data pointers, which can always be used.

6. The device according to claim 5, wherein said selection means further selects a group of data pointers pointing to said groups of area-defining data pointers, said selected group of data pointers being designated by operating the external device as the group defining the data-storing areas which can be used.

7. The device according to claim 6, wherein said data pointers pointing to the data-storing areas include area number data representing a data-storing area, head address data defining the position of the data-storing area in said second area, and size data representing the size of the data-storing area, said data pointers pointing to said groups of area-defining data pointers including code data representing a code of a group of area-defining data pointers, head address data defining the position of the group in said directory area, and size data representing the size of the group, and said selection means selecting said group pointing to the data-storing areas which can always be used, and also selecting another group which has been designated, by operating the external device, as the group pointing to the data-storing areas which can be used.

8. The device according to claim 1, wherein said directory area is logically separated from said second area.

9. The device according to claim 1, wherein said directory area is physically separated from said second area.

10. The device according to claim 1, wherein it is impossible to rewrite the data stored in said directory area.

11. The device according to claim 1, wherein it is possible to rewrite the data stored in said directory area.

12. A portable electronic device into which data can be input and from which data can be output, said device comprising:
   input/output means for receiving data from an external device and supplying data thereto;
   a plurality of data-storing means, each for storing a unit of data;
   first group memory means for storing at least one data pointer pointing to one of said data-storing means;
   second group memory means for storing a data pointer pointing to one of the areas of said first group memory means;
   selecting means for selecting one of the areas of said first group memory means, in accordance with the data which has been received from the external device to said input/output means, as an area which can be used;
   means for storing the data supplied to said input/output means from the external device into one of the data-storing means defined by the data pointer stored in the selected area of said first group memory means; and
   means for reading data from one of the data-storing means defined by the data pointer stored in the selected area of said first group memory means and supplying this data to the external device via said input/output means.

13. The device according to claim 12, wherein said data pointers pointing to the data-storing means include area number data representing a data-storing means, head address data defining the position of the data-storing means, and size data representing the size of the data-storing means, said data pointers pointing to the areas of said first group memory means including code data representing the code of an area of said first group memory means, head address data defining the position of the area of said first group memory means, and size data representing the size of the area of said first group memory means, and said selecting means selects one of the areas of said first group memory means, which has a code identical to a code contained in the data supplied to said input/output means from the external device, as an area which can be used.

14. The device according to claim 12, wherein said selecting means selects at least one of the areas of said first group memory means as an area which can be always used, and also one of the remaining areas of said first group memory means as an area which can be used in accordance with the data supplied to said input/output means from the external device; said storing means stores the data supplied to said input/output means from the external device into one of the data-storing means defined by the data pointer stored in the selected area of said first group memory means; and said reading means reads data from one of the data-storing means pointed to by the data pointer stored in the selected area of said first group memory means and supplies this data to the external device via said input/output means.

15. The device according to claim 14, wherein said data pointers pointing to the data-storing means include area number data representing a data-storing means, head address data defining the position of the data--storing means, and size data representing the size of the data-storing means, said data pointers pointing to the areas of said first group memory means including code data representing a code of an area of said first group memory means, head address data defining the position of the area of said first group memory means, and size data representing the size of the area of said first group memory means, and said selecting means selects at least one of the areas of said first group memory means as an area which can be always used, and also selects one of the remaining areas of said first group memory means, which has a code identical to the code contained in the data supplied to said input/output means, as an area which can be used.

16. The device according to claim 12, wherein said first group memory means is logically separated from said second group memory means.

17. The device according to claim 12, wherein said first group memory means is physically separated from said second group memory means.

18. The device according to claim 12, wherein it is impossible to rewrite the data stored in said first group memory means and second group memory means.

19. The device according to claim 12, wherein it is possible to rewrite the data stored in said first group memory means and second group memory means.

20. A portable electronic device into which data can be input and from which data can be output, comprising:

data memory means having at least a first area and a second area, said first area having two field of activity areas, one of said field of activity areas storing groups of area-defining group designation data pointers, each group of area-defining group designation data pointers pointing to a given one of area-defining groups, each area-defining group corresponding to a field of activity in which said electronic device is used, said each group of area-defining group designation data pointers being used for selection and designation of one of said area-defining groups, and each other area storing said area-defining groups containing items of area-defining information to be selected by designating a given one of said groups of area-defining group designation data pointers, said second area having a plurality of areas each defined by pointers of area-defining information contained in a given one of said area-defining groups; and control means for receiving, from an external device, an area-defining group designation command; for finding a corresponding one of said groups of area-defining group designation data pointers; and for performing a control action to render usable only one of said area-defining groups, which is defined by the found group of area-defining group designation data pointers.

* * * * *